(12) United States Patent
Yoneda et al.

(10) Patent No.: US 11,283,938 B2
(45) Date of Patent: Mar. 22, 2022

(54) COMMUNICATION APPARATUS COMMUNICATING WITH ANOTHER COMMUNICATION APPARATUS BASED ON PERFORMANCE, CONTROL METHOD, AND STORAGE MEDIUM

(71) Applicant: CANON KABUSHIKI KAISHA, Tokyo (JP)

(72) Inventors: Naoto Yoneda, Tokyo (JP); Takahiro Kitsunai, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/076,628

(22) Filed: Oct. 21, 2020

(65) Prior Publication Data
US 2021/0136237 A1 May 6, 2021

(30) Foreign Application Priority Data
Oct. 31, 2019 (JP) .............................. JP2019-199105

(51) Int. Cl.
*G06F 15/00* (2006.01)
*H04N 1/00* (2006.01)
*H04N 9/64* (2006.01)
*H04N 9/73* (2006.01)

(52) U.S. Cl.
CPC ..... *H04N 1/00214* (2013.01); *H04N 1/00167* (2013.01); *H04N 9/646* (2013.01); *H04N 9/73* (2013.01)

(58) Field of Classification Search
CPC .................. H04N 1/00214; H04N 1/00167
USPC .................................................... 358/1.15
See application file for complete search history.

(56) References Cited

U.S. PATENT DOCUMENTS

| | | | | |
|---|---|---|---|---|
| 2010/0277508 | A1* | 11/2010 | Takahashi | H04N 1/00238 345/660 |
| 2015/0264246 | A1* | 9/2015 | Sartor | H04N 5/77 348/211.3 |
| 2015/0281573 | A1* | 10/2015 | Sasaki | H04N 5/772 348/231.99 |

FOREIGN PATENT DOCUMENTS

JP 2005-251166 A 9/2005

* cited by examiner

*Primary Examiner* — Mark R Milia
(74) *Attorney, Agent, or Firm* — Canon U.S.A., Inc. IP Division

(57) ABSTRACT

A first communication apparatus includes a communication unit configured to communicate with a second communication apparatus, an image processing unit, and a control unit. The control unit generates the first image data from the RAW image data received from the second communication apparatus. In a case where the control unit determines that a performance of the second communication apparatus is equal to or higher than a predetermined performance, the control unit transmits the first image data to the second communication apparatus. In a case where the control unit determines that a performance of the second communication apparatus is lower than the predetermined performance, the control unit generates the second image data from the first image data, and transmits the generated second image data to the second communication apparatus.

20 Claims, 15 Drawing Sheets

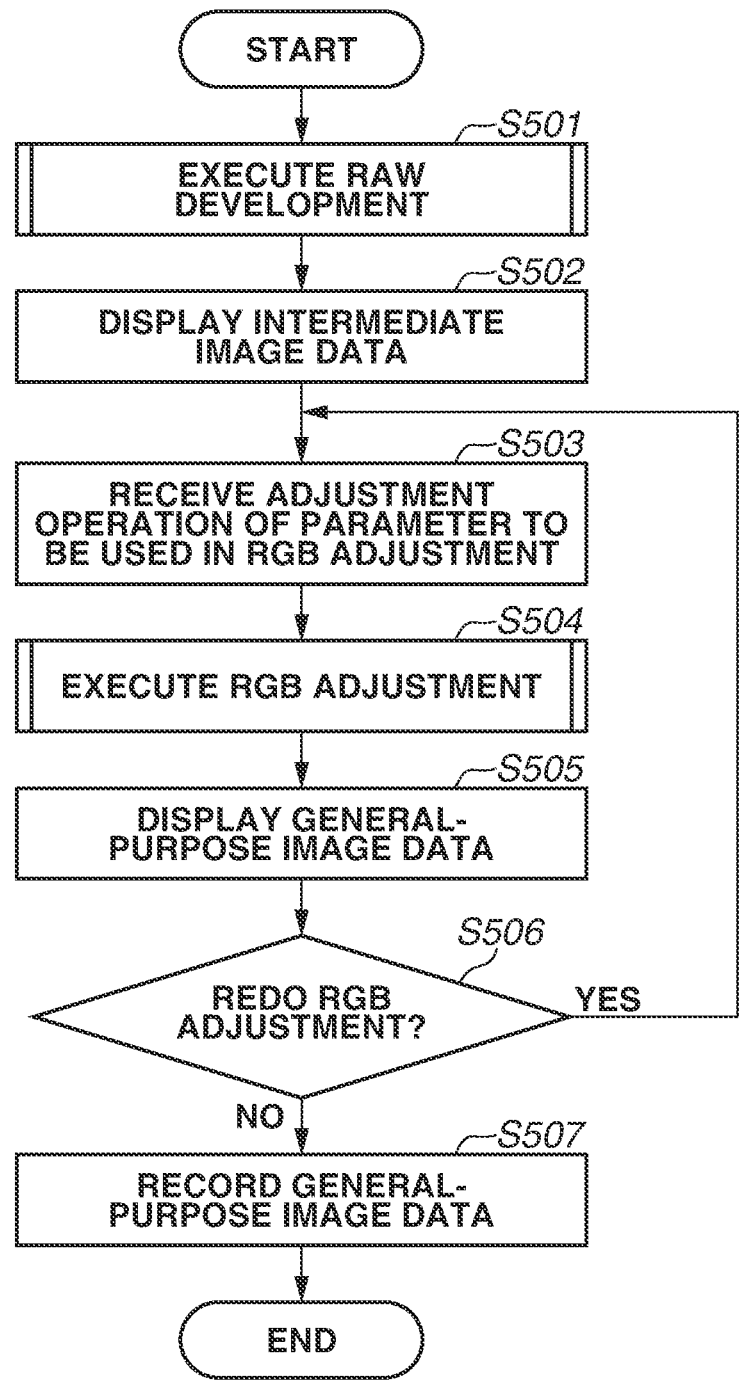

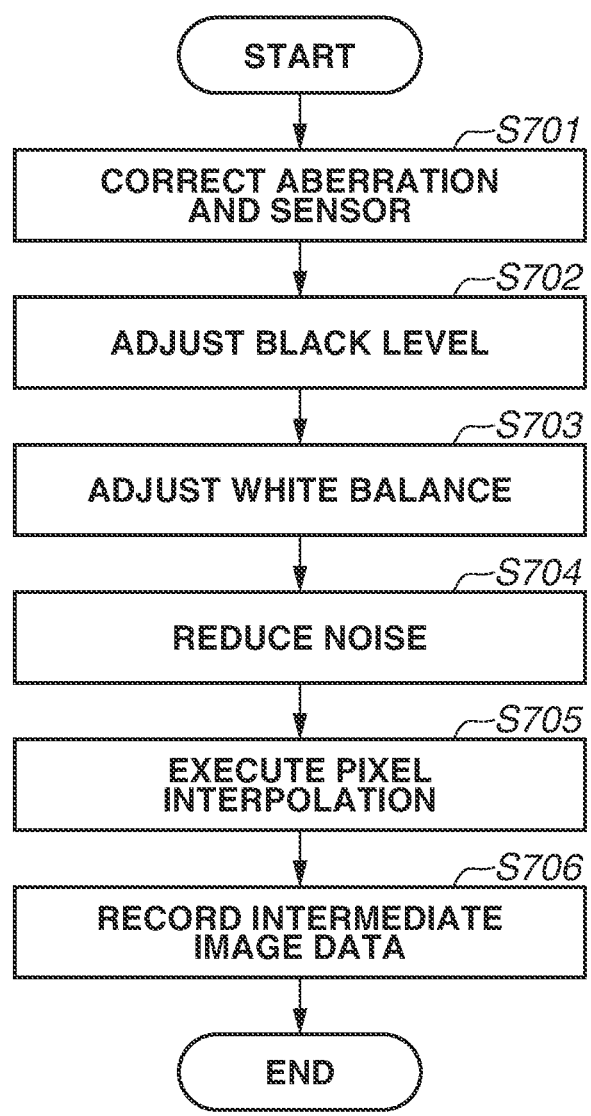

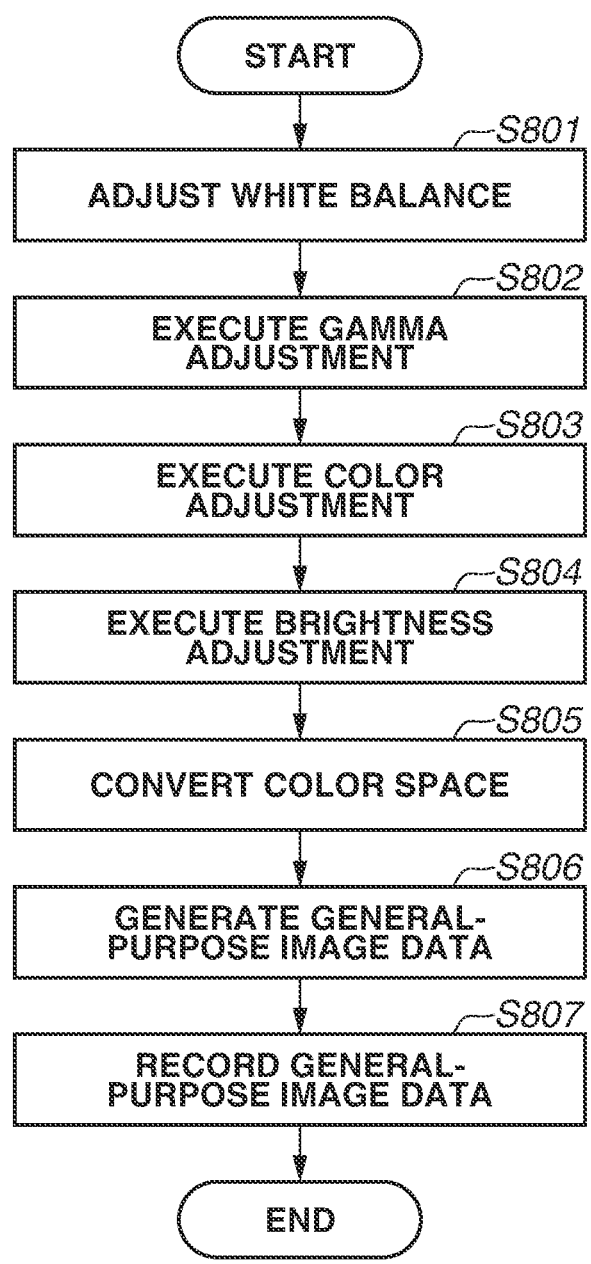

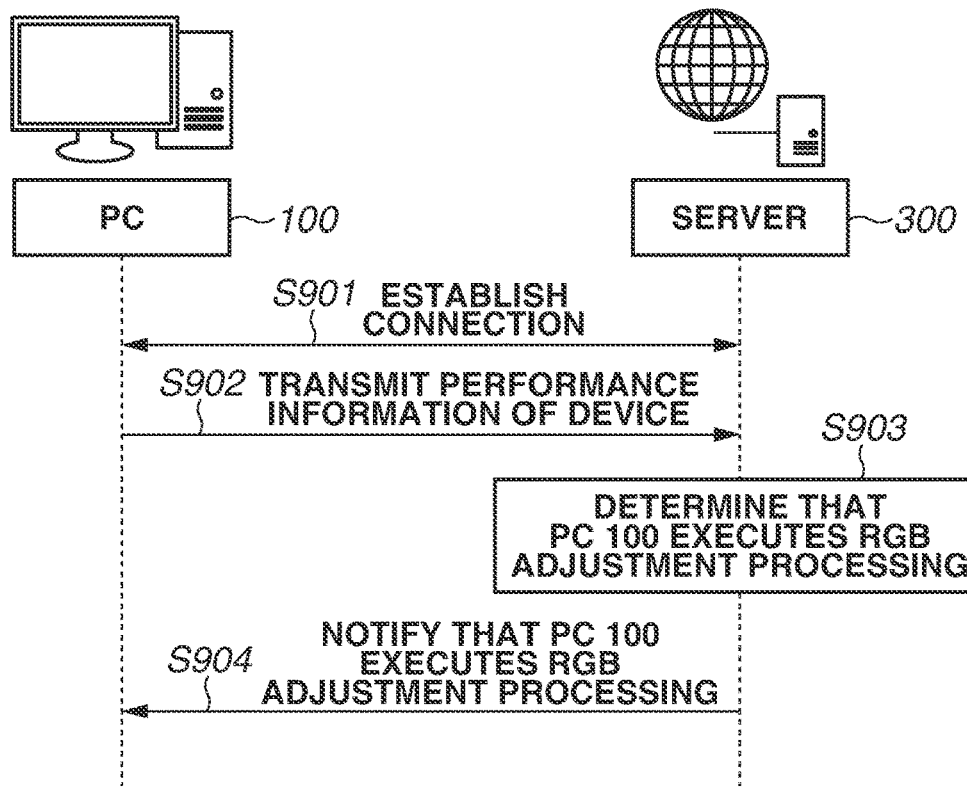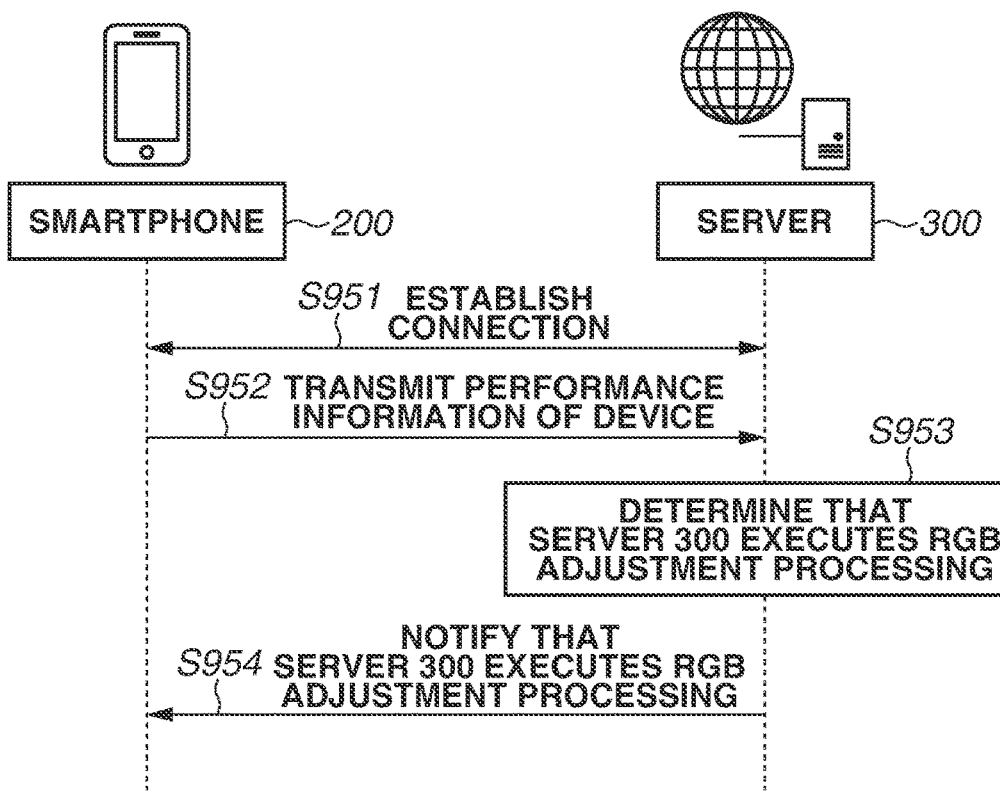

COMMUNICATION APPARATUS COMMUNICATING WITH ANOTHER COMMUNICATION APPARATUS BASED ON PERFORMANCE, CONTROL METHOD, AND STORAGE MEDIUM

BACKGROUND

Field

One disclosed aspect of the embodiments relates to a communication apparatus that develops image data.

Description of the Related Art

An imaging apparatus such as a digital camera or a smartphone compresses data input from an image sensor such as a charge-coupled device (CCD) sensor or a complementary metal-oxide semiconductor (CMOS) sensor, based on an image format such as a Joint Photographic Experts Group (JPEG) or a Tag Image File Format (TIFF), and records the compressed data onto a memory card as image data. Because the above-described compression processing is generally irreversible encoding, the user cannot make a large readjustment on image data after the compression.

Nevertheless, in recent years, an imaging apparatus such as a smartphone or a digital camera has become capable of directly digitalizing an electrical signal read out from an image sensor, and recording the digitalized electrical signal as image data. The image data recorded in this manner will be referred to as a RAW image data. By developing the RAW image data using a personal computer (PC), a user can obtain an image closer to an intended image than an image developed by an imaging apparatus. Japanese Patent Application Laid-Open No. 2005-251166 discusses a development processing method of RAW image data.

Because development processing of RAW image data involves a large calculation amount, a general PC or a smartphone requires a long time for executing the development processing. On the other hand, in recent years, by using a so-called cloud service, the user can develop RAW image data in a relatively short time using a server existing on a cloud. Nevertheless, also in this case, because a server existing on the cloud executes development processing even when the development processing is processing involving a small calculation amount like the fine adjustment of parameters used in the development processing, for example, the user having a high-performance PC feels inefficient in some aspects.

SUMMARY

According to an aspect of the embodiments, a first communication apparatus includes a communication unit configured to communicate with a second communication apparatus, an image processing unit, and a control unit. The control unit controls a function of generating first image data from RAW image data by the image processing unit, and a function of generating second image data from the first image data by the image processing unit. The control unit develops RAW image data by generating, by the image processing unit, the second image data from the first image data generated from RAW image data. The control unit receives RAW image data from the second communication apparatus via the communication unit, wherein the control unit generates, by the image processing unit, the first image data from the RAW image data received from the second communication apparatus. In a case where the control unit determines that a performance of the second communication apparatus is equal to or higher than a predetermined performance, the control unit transmits the first image data generated from the RAW image data received from the second communication apparatus, to the second communication apparatus via the communication unit. In a case where the control unit determines that a performance of the second communication apparatus is lower than the predetermined performance, the control unit generates, by the image processing unit, the second image data from the first image data generated from the RAW image data received from the second communication apparatus, and transmits the generated second image data to the second communication apparatus via the communication unit.

Further features of the embodiments will become apparent from the following description of exemplary embodiments with reference to the attached drawings.

BRIEF DESCRIPTION OF THE DRAWINGS

FIG. 5 is a flowchart illustrating an example of processing of developing RAW image data according to the first exemplary embodiment.

FIG. 7 is a flowchart illustrating an example of RAW development processing according to the first exemplary embodiment.

FIG. 8 is a flowchart illustrating an example of RGB adjustment processing according to the first exemplary embodiment.

FIG. 9A is a sequence diagram illustrating an example of processing in which the PC and the server according to the first exemplary embodiment connect with each other. FIG. 9B is a sequence diagram illustrating an example of processing in which the smartphone and the server according to the first exemplary embodiment connect with each other.

DESCRIPTION OF THE EMBODIMENTS

Hereinafter, exemplary embodiments will be described in detail with reference to the attached drawings.

The following exemplary embodiments each serve as an example of an implementation tool of an embodiment, and may be appropriately modified or changed depending on various conditions and the configuration of an apparatus to which the disclosure is applied. In addition, the exemplary embodiments can also be appropriately combined.

System Configuration Diagram

Figure 1:
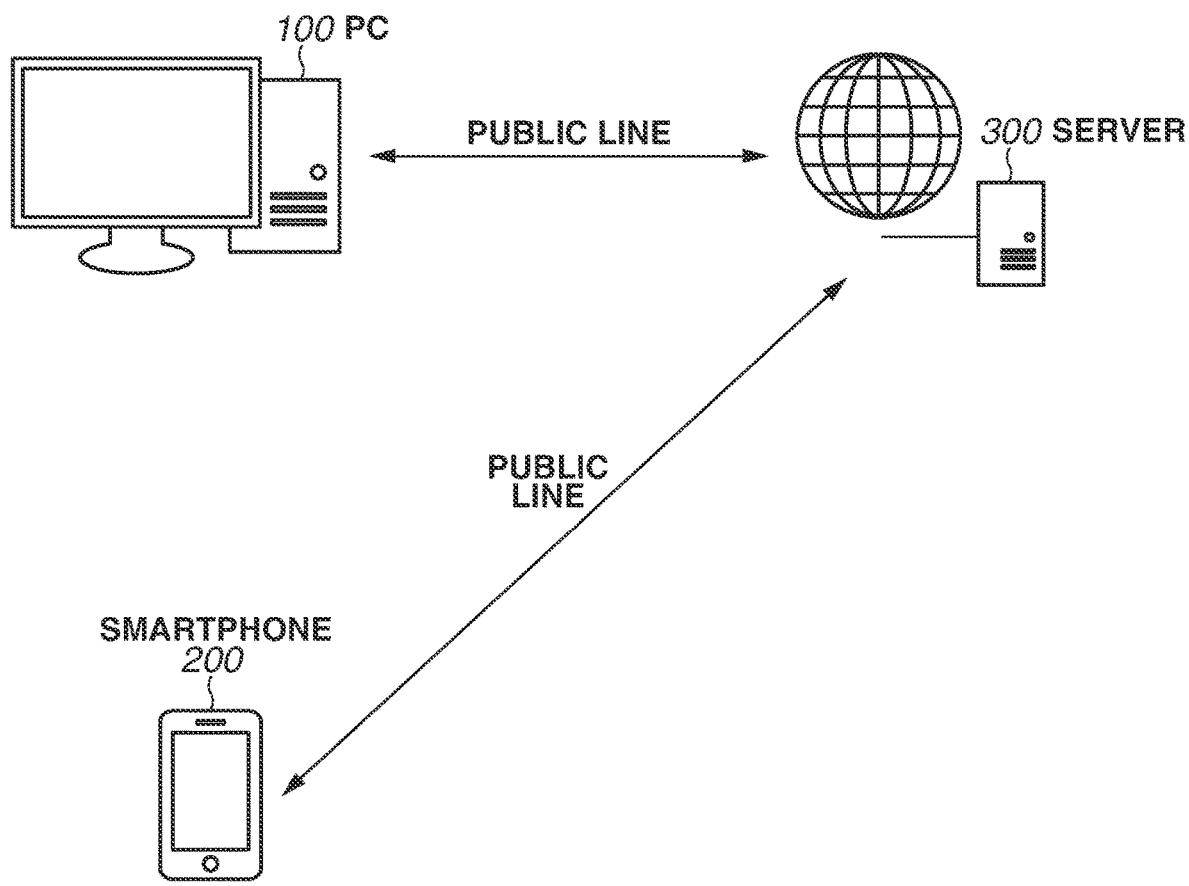
FIG. 1 is a diagram illustrating an example of a system configuration according to a first exemplary embodiment.

FIG. 1 is a diagram illustrating an example of a system configuration according to the present exemplary embodiment. A personal computer (PC) 100 and a smartphone 200 perform data communication with a server 300. The configuration of each apparatus will be described below. In the data communication, data obtained by a digital camera performing image capturing, such as image data and moving image data, is especially transmitted and received. For example, the PC 100 and the smartphone 200 each transmit image data and moving image data to the server 300. The server 300 develops the image data and the moving image data that have been received from the PC 100 and the smartphone 200. The server 300 further returns the developed image data and moving image data to the PC 100 and the smartphone 200. In this manner, the PC 100 and the smartphone 200 can develop image data and moving image data using the server 300.

Configuration of PC 100

Figure 2:
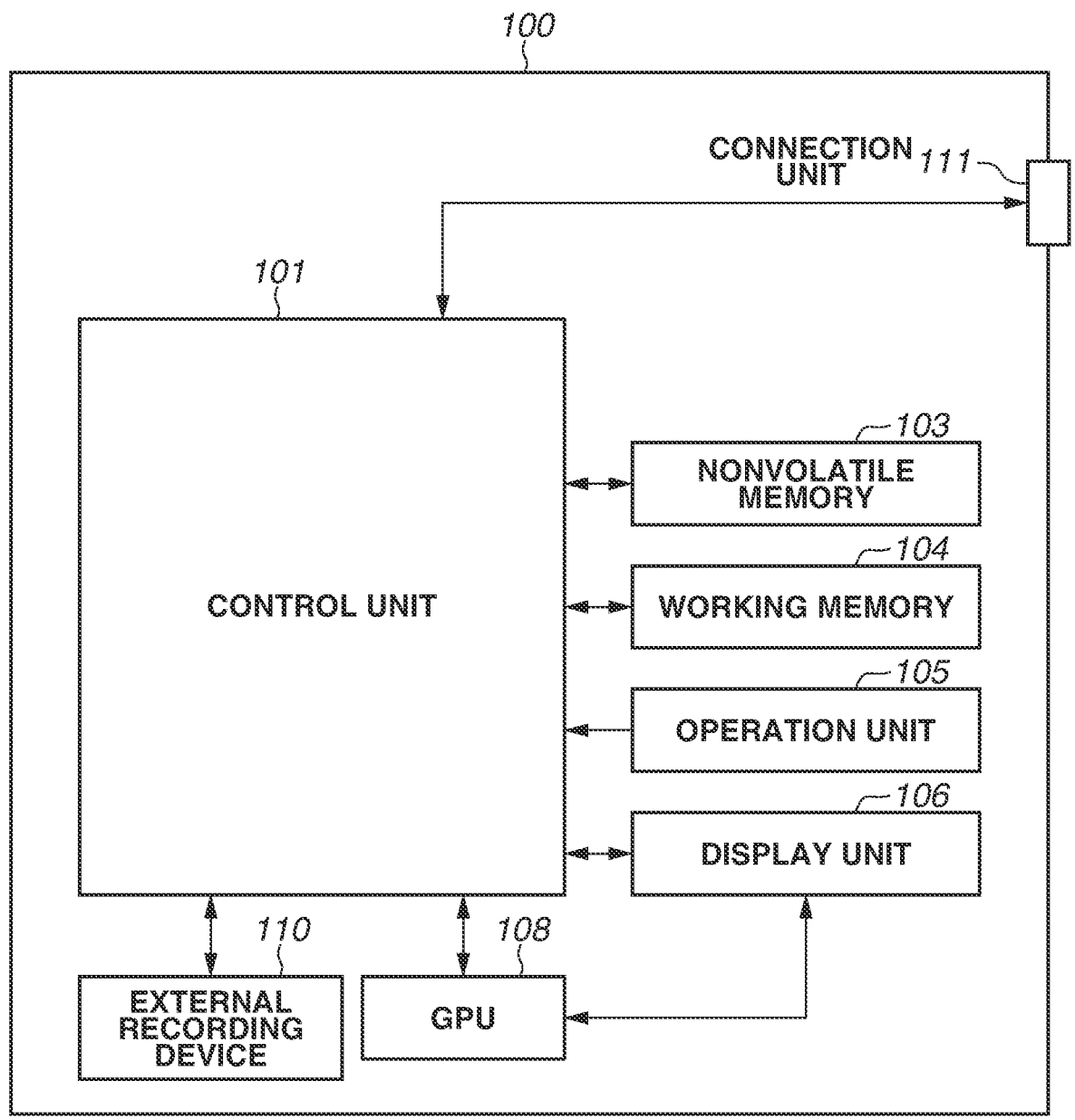
FIG. 2 is a block diagram illustrating an example of a configuration of a personal computer (PC) according to the first exemplary embodiment.

FIG. 2 is a block diagram illustrating an example of a configuration of the PC 100 serving as an example of a communication apparatus according to the present exemplary embodiment. In the present exemplary embodiment, the description will be especially given using, as an example, a communication apparatus used in a state of being stationary, like a personal computer.

A control unit 101 controls each unit of the PC 100 in accordance with an input signal or a program to be described below. Instead of the control unit 101 controlling the entire apparatus, a plurality of pieces of hardware may control the entire apparatus by sharing the roles in performing processing.

A nonvolatile memory 103 is a nonvolatile memory that is electrically erasable and recordable. An operating system (OS) being basic software to be executed by the control unit 101, and an application that implements an applicative function in cooperation with the OS are recorded on the nonvolatile memory 103. For example, the nonvolatile memory 103 is a hard disk drive (HDD) or a solid state drive (SSD). In the present exemplary embodiment, an application (hereinafter, will be referred to as an image processing application) that can perform image processing of image data such as RAW image data is stored in the nonvolatile memory 103. The RAW image data will be described below.

A working memory 104 is a volatile memory. The working memory 104 is used as a work area of the control unit 101 or a save area of data in error processing.

An operation unit 105 is used for receiving an instruction to the PC 100 from the user. For example, the operation unit 105 includes a power button for the user issuing a power on/off instruction to the PC 100, and an input device such as a keyboard or a mouse. The operation unit 105 also includes a touch panel formed on a display unit 106 to be described below. The operation unit 105 needs not be always built in the PC 100. The PC 100 can connect with an internal or external operation unit 105.

The display unit 106 displays characters or images for a dialogical operation. For example, the display unit 106 is a liquid crystal display or an organic electroluminescence (EL) display. In addition, a graphical user interface (GUI) of the image processing application is also displayed on the display unit 106. The display unit 106 needs not be always built in the PC 100. The PC 100 can connect with an internal or external display unit 106, and is only required to at least include a function of controlling the display performed by the display unit 106.

A graphics processing unit (GPU) 108 is an image processing unit specialized for image processing. By using the GPU 108, the control unit 101 can execute the display of image data on the display unit 106 and image processing such as development processing of image data.

An external recording device 110 is a device that performs readout and writing with respect to an external recording medium. In a case where programs and image data are recorded on the external recording medium, the programs and image data are loaded onto the working memory 104 via the external recording device 110. For example, the external recording medium is a nonvolatile memory detachably attached to the PC 100, such as an optical disk including a digital versatile disc-rewritable (DVD-RW), a compact disk read only memory (CD-ROM), a CD recordable (CD-R), and a DVD random access memory (DVD-RAM), a magnetic disk including a flexible disk and a magnetooptic disk (MO), or a detachable flash memory.

A connection unit 111 is an interface for connecting with an external device. The PC 100 according to the present exemplary embodiment can transmit and receive data to and from an external device via the connection unit 111. The PC 100 can also connect with an imaging apparatus such as a digital camera via the connection unit 111, and transmit and receive data. The communication performed by the connection unit 111 may be whichever of wired communication and wireless communication.

The configuration example of the PC 100 has been described above.

Configuration of Smartphone 200

Figure 3:
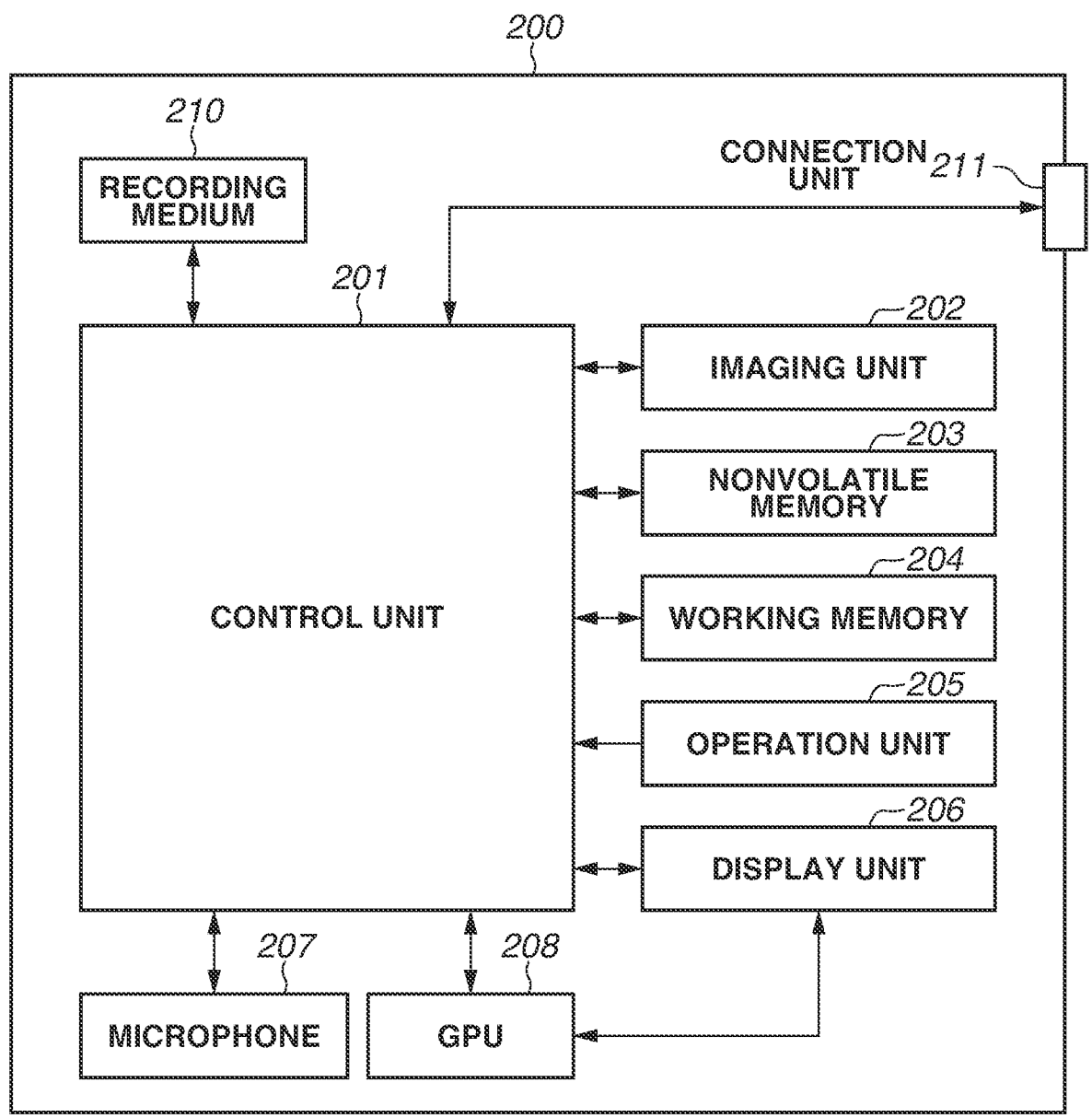
FIG. 3 is a block diagram illustrating an example of a configuration of a smartphone according to the first exemplary embodiment.

FIG. 3 is a block diagram illustrating a configuration example of the smartphone 200 serving as an example of a communication apparatus according to the present exemplary embodiment. In the present exemplary embodiment, the description will be especially given using, as an example, a communication apparatus that can be carried by the user like a smartphone. Examples of such a portable communication apparatus further include a tablet device and a digital camera.

A control unit 201 controls each unit of the smartphone 200 in accordance with an input signal or a program to be described below. Instead of the control unit 201 controlling the entire apparatus, a plurality of pieces of hardware may control the entire apparatus by sharing the roles in performing processing.

An imaging unit 202 includes, for example, an optical lens unit, an optical system that controls a diaphragm, zoom, and focus, and an image sensor for converting light (video) introduced through the optical lens unit, into an electrical video signal. For example, the image sensor includes a complementary metal oxide semiconductor (CMOS) sensor and a charge coupled device (CCD) sensor. By being controlled by the control unit 201, the imaging unit 202 converts subject light formed by a lens included in the imaging unit 202, into an electrical signal using the image sensor, performs noise reduction processing, and outputs digital data as image data. In the present exemplary embodiment, a series of processes for obtaining and outputting the image data will be referred to as "image capturing". In addition, the imaging unit 202 can generate moving image data by recording, as one piece of data, pieces of image data consecutively obtained by performing image capturing. In the smartphone 200 according to the present exemplary embodiment, image data and moving image data are recorded onto a recording medium 210 in accordance with a standard of a design rule for camera file system (DCF). The imaging unit 202 can also record an electrical signal output from the image sensor, onto the recording medium 210 without performing image processing on the electrical signal. An image in a record format that is obtained by directly digitalizing an electrical signal read out from an image sensor and recording the electrical signal in this manner will be referred to as RAW image data. In a similar manner, a moving image in such a record format will be referred to as a RAW moving image. Because RAW image data is an image obtained by directly digitalizing an electrical signal read out from an image sensor and saving the electrical signal, the as-is RAW image data cannot be viewed as an image or cannot be subjected to image correction.

A nonvolatile memory 203 is a nonvolatile memory that is electrically erasable and recordable, and stores programs to be described below and executed by the control unit 201. In the present exemplary embodiment, the image processing application is stored in the nonvolatile memory 203.

A working memory 204 is used as a buffer memory for temporarily holding image data and moving image data obtained by the imaging unit 202, an image display memory for a display unit 206, or a work area of the control unit 201.

An operation unit 205 is used for receiving an instruction to the smartphone 200 from the user. For example, the operation unit 205 includes a power button for the user issuing a power on/off instruction to the smartphone 200, a release switch for issuing an image capturing instruction, and a reproduction button for issuing an image data reproduction instruction. The operation unit 205 further includes an operation member such as a dedicated connection button for starting communication with an external device via a connection unit 211 to be described below. The operation unit 205 also includes a touch panel formed on the display unit 206 to be described below.

The display unit 206 displays a viewfinder image captured during image capturing, displays image data obtained by image capturing, and displays characters for a dialogical operation. A GUI of the image processing application is also displayed on the display unit 206. The display unit 206 needs not be always built in the smartphone 200. The smartphone 200 can connect with an internal or external display unit 206, and is only required to at least include a display control function of controlling the display performed by the display unit 206. In addition, the control unit 201 sequentially transfers image data or moving image data accumulated in the working memory 204, to the display unit 206, and displays the image data or moving image data on the display unit 206. The display unit 206 thereby functions as an electric viewfinder. The smartphone 200 can thereby execute live image display (live view display).

A microphone 207 is used for inputting acoustic waves such as sound or voice to the smartphone 200. The microphone 207 converts sound or voice into an electrical signal and inputs the converted sound or voice to the smartphone 200. The control unit 201 generates voice data from an input electrical signal. The control unit 201 can record moving image data by synchronously recording the voice data and video data obtained by the imaging unit 202. The microphone 207 may be detachably attached to the smartphone 200, or may be built into the smartphone 200. In other words, the smartphone 200 is only required to at least include a unit for receiving an electrical signal from the microphone 207.

A GPU 208 is an image processing unit specialized for image processing. By using the GPU 208, the control unit 201 can execute the display of image data on the display unit 206, and image processing such as development processing. In the present exemplary embodiment, a processing performance of the GPU 208 is lower than that of the GPU 108.

The recording medium 210 can record image data and moving image data that have been output from the imaging unit 202. For example, the recording medium 210 includes a secure digital (SD) card and an SSD. The recording medium 210 may be detachably attached to the smartphone 200, or may be built into the smartphone 200. In other words, the smartphone 200 is only required to at least include a unit for accessing the recording medium 210.

The connection unit 211 is an interface for communicating with an external device. The control unit 201 implements communication with an external device by controlling the connection unit 211. The smartphone 200 according to the present exemplary embodiment can perform data exchange with the server 300 via the connection unit 111. For example, the smartphone 200 can transmit image data generated by the imaging unit 202, to the server 300 via the connection unit 211. In the present exemplary embodiment, the connection unit 211 includes an interface for performing communication using a wireless local area network (LAN) that is compliant with the standard of Institute of Electrical and Electronics Engineers (IEEE) 802.11. The communication method is not limited to a wireless LAN. For example, the communication method includes a public wireless communication method such as 4G or LTE, and a wired communication method that is compliant with a standard such as Ethernet.

The configuration example of the smartphone 200 has been described above.

Configuration of Server 300

Figure 4:
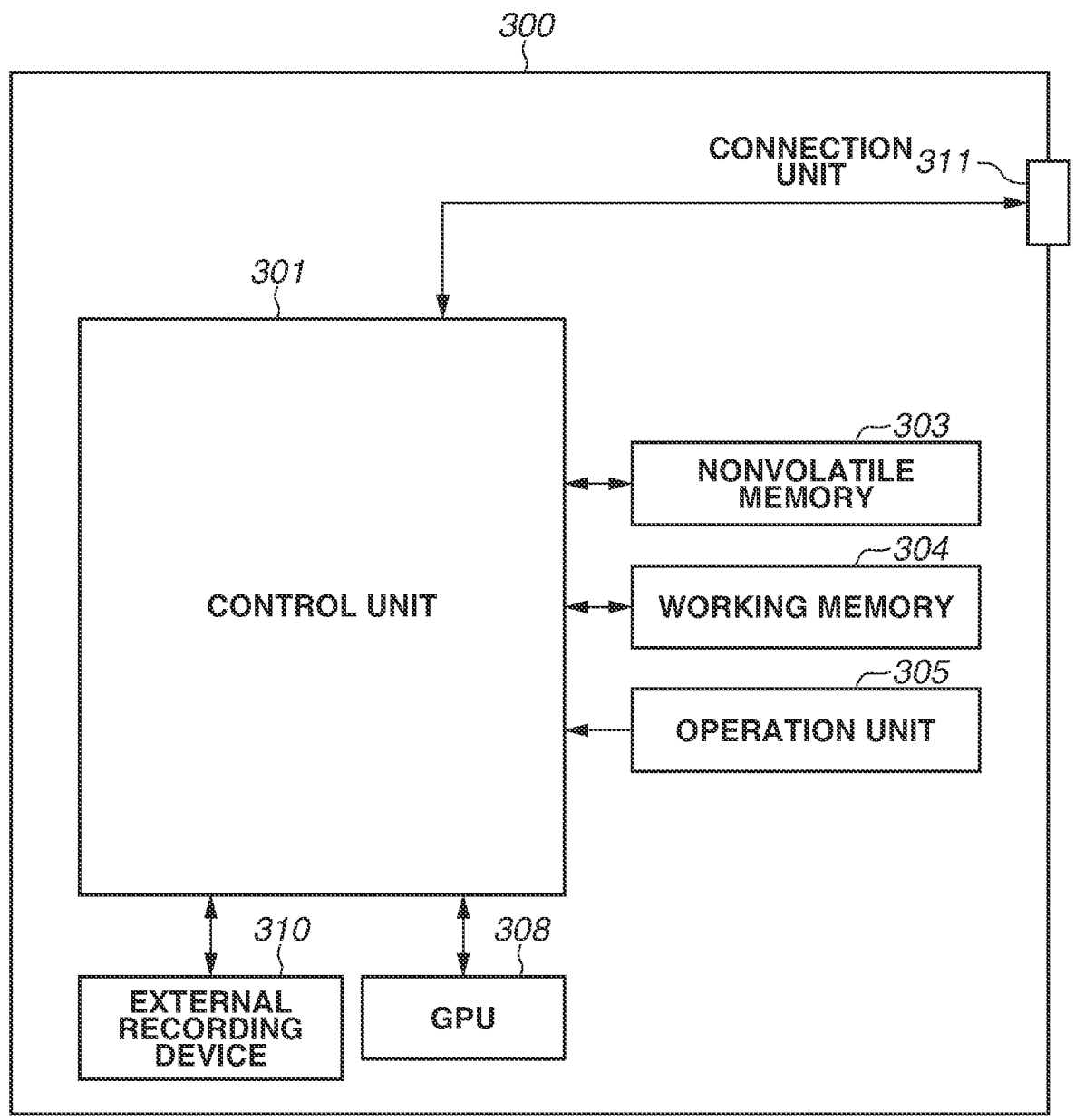
FIG. 4 is a block diagram illustrating an example of a configuration of a server according to the first exemplary embodiment.

FIG. 4 is a block diagram illustrating an example of a configuration of the server 300 serving as an example of a communication apparatus according to the present exemplary embodiment.

A control unit 301 controls each unit of the server 300 in accordance with an input signal or a program to be described below. Instead of the control unit 301 controlling the entire apparatus, a plurality of pieces of hardware may control the entire apparatus by sharing the roles in performing processing.

A nonvolatile memory 303 is a nonvolatile memory that is electrically erasable and recordable. An OS being basic software to be executed by the control unit 301, and an application that implements an applicative function in cooperation with the OS are recorded on the nonvolatile memory 303. In the present exemplary embodiment, the image processing application is stored in the nonvolatile memory 303. For example, the nonvolatile memory 303 is an HDD, an SSD, a ROM, a flash memory, or an optical disk.

A working memory 304 is a volatile memory. The working memory 304 is used as a work area of the control unit 301 or a save area of data in error processing.

An operation unit 305 is used for receiving an instruction to the server 300 from the user. For example, the operation unit 305 includes a power button for the user issuing a power on/off instruction to the server 300, and an input device such as a keyboard or a mouse. The operation unit 305 needs not be always built in the server 300. The server 300 can connect with an internal or external operation unit 305.

A GPU 308 is an image processing unit specialized for image processing. By using the GPU 308, the control unit 301 can execute image display on a display unit 306 and calculation processing. In the present exemplary embodiment, a processing performance of the GPU 308 is higher than those of the GPUs 108 and 208.

An external recording device 310 is a device that performs readout and writing with respect to an external recording medium. In a case where programs and image data are recorded on the external recording medium, the programs and image data are loaded onto the working memory 304 via the external recording device 310. For example, the external recording medium is a nonvolatile memory detachably attached to the server 300, such as an optical disk including a DVD-RW, a CD-ROM, a CD-R, and a DVD-RAM, a magnetic disk including a flexible disk and an MO disk, or a detachable flash memory.

A connection unit 311 is an interface for communicating with an external device. The server 300 according to the present exemplary embodiment can transmit and receive data to and from an external device via the connection unit 311. The server 300 can also connect with an imaging apparatus such as a digital camera via the connection unit 311, and transmit and receive data. The communication performed by the connection unit 311 may be whichever of wired communication and wireless communication.

The configuration example of the server 300 has been described above.

In the present exemplary embodiment, the GPU 108, the GPU 208, and the GPU 308 have higher performances in the order of the GPU 308, the GPU 108, and the GPU 208. Generally, a stationary device such as a PC includes a member having a higher image processing performance than that of a portable apparatus such as a smartphone. Thus, in the present exemplary embodiment, performances are defined as described above.

Development Processing

Development processing of RAW image data according to the present exemplary embodiment will be described. In the present exemplary embodiment, for the sake of convenience, the development processing of RAW image data is separated into two pieces of processing including RAW development processing and RGB adjustment processing. FIG. 5 is a flowchart illustrating an example of processing in which the PC 100 develops RAW image data. The processing is implemented by loading a program recorded on the nonvolatile memory 103, onto the working memory 104, and executing the program by the control unit 101. The processing illustrated in the flowchart is started being triggered by the control unit 101 reading RAW image data by the image processing application.

In step S501, the control unit 101 executes RAW development processing of the development processing in which the GPU 108 develops RAW image data. In the present exemplary embodiment, the control unit 101 performs RAW development based on attribute information included in RAW image data. The attribute information is an image capturing condition determined at the time of the image capturing of RAW image data. For example, the attribute information includes a bit depth, an exposure time, a shutter speed, an aperture value, a luminance value, an exposure correction value, a lens minimum F number, a subject distance, a photometry method, a light source, the presence or absence of flash, a lens focal length, an F number, an ISO speed rate, and flash intensity. By the RAW development processing, intermediate image data is generated from RAW image data. The intermediate image data is image data on which development processing has been partially executed, and is data in a file format different from those of RAW image data and general-purpose image data to be described below. The RAW development processing will be described below.

In step S502, the control unit 101 displays the intermediate image data generated in step S501, on the display unit 106.

Figure 6A:
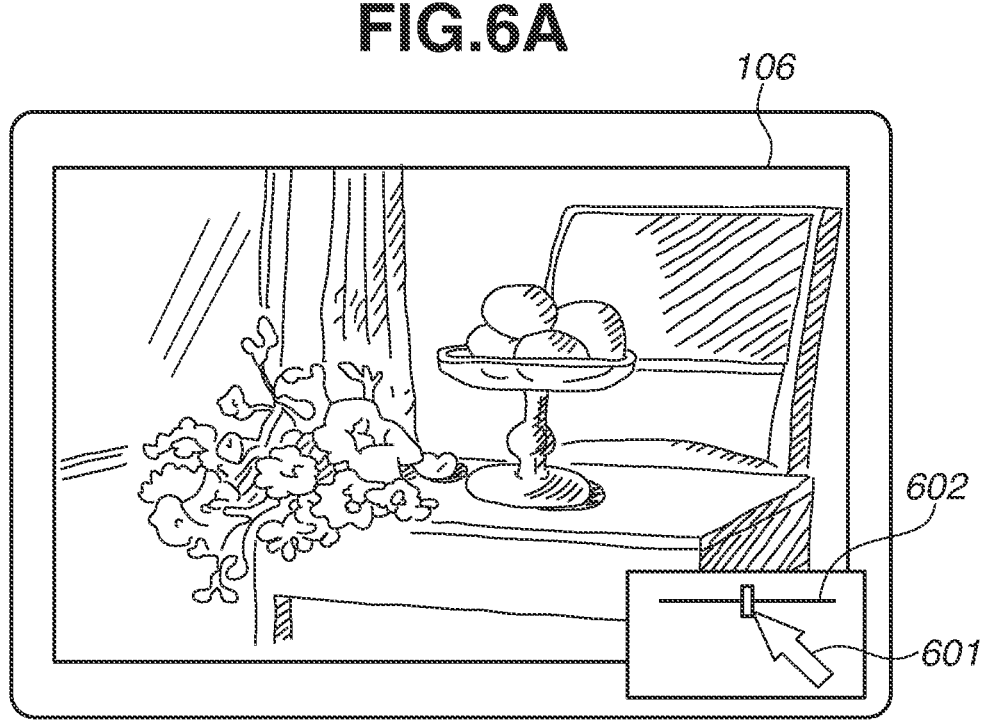
FIG. 6A illustrates an example of a screen for adjusting saturation of intermediate image data of the PC according to the first exemplary embodiment.
Figure 6B:
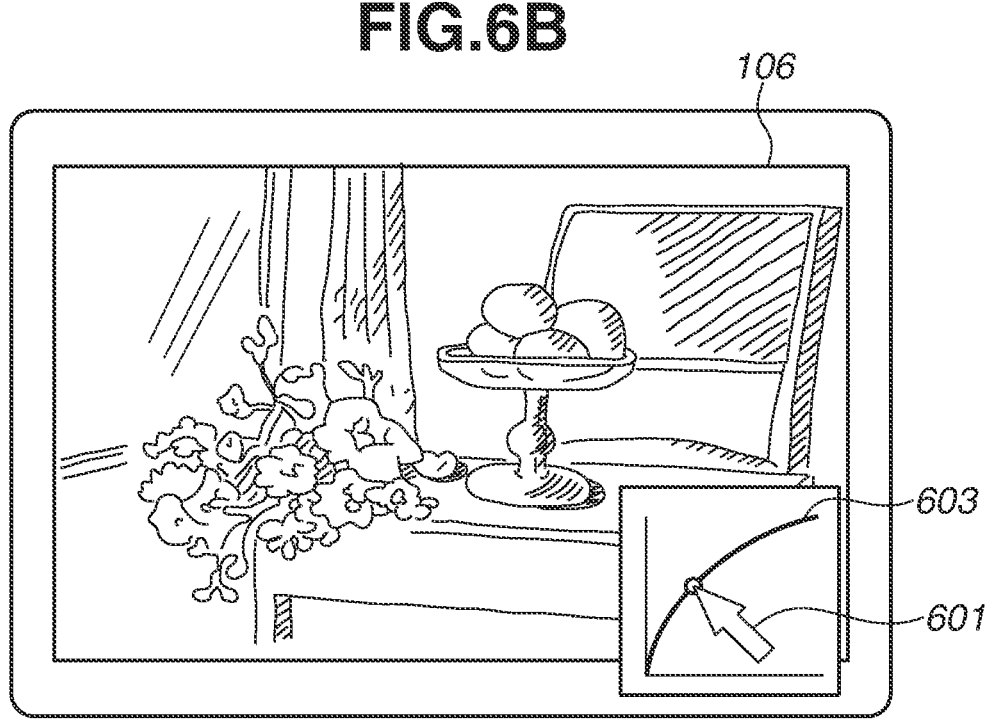
FIG. 6B illustrates an example of a screen for adjusting gradation of intermediate image data of the PC according to the first exemplary embodiment.

In step S503, the control unit 101 receives an adjustment operation of a parameter to be used in RGB adjustment processing to be executed in step S504, from the user via the operation unit 105. In the present exemplary embodiment, the user adjusts a parameter to be used in RGB adjustment processing, via a GUI of the image processing application. For example, FIGS. 6A and 6B respectively illustrate examples of a screen for saturation adjustment and a screen for gradation adjustment in the image processing application. For example, in FIG. 6A, the user operates a slider 602 displayed on the display unit 106, via the operation unit 105 using a cursor 601, and adjusts saturation of intermediate image data. Alternatively, for example, as illustrated in FIG. 6B, the user operates a tone curve 603 displayed on the display unit 106, via the operation unit 105 using the cursor 601, and adjusts gradation of intermediate image data. In addition, in this step, the user can perform parameter adjustment of white balance, hue, contrast, brightness, sharpness, and resize, for example. By operating a menu of the image processing application, the user can selectively switch a screen for adjusting each parameter. In this manner, the user adjusts a parameter to be used in RGB adjustment processing, using the image processing application. Then, for example, in a case where the control unit 101 determines that the adjustment of one parameter has been completed, the processing proceeds to step S504.

In step S504, the control unit 101 executes RGB adjustment processing of development processing of RAW image data, on the intermediate image data generated by the GPU 108 in step S501. By the RGB adjustment processing, general-purpose image data is generated from the intermediate image data. The general-purpose image data is image data compressed based on an image format such as Joint Photographic Experts Group (JPEG), Portable Network Graphics (PNG), High Efficiency Video Coding (HEVC), and a Tag Image File Format (TIFF). The RGB adjustment processing will be described below.

In step S505, the control unit 101 displays the general-purpose image data generated in step S504, on the display unit 106.

In step S506, the control unit 101 determines whether to redo the RGB adjustment processing. For example, in a case where the user performs an operation for adjusting RGB again, using the operation unit 105, the control unit 101 determines to redo RGB adjustment (YES in step S506), and the processing returns to step S501. For example, in a case where the user performs an operation for ending RGB adjustment, using the operation unit 105, the control unit 101 determines that RGB adjustment has been completed (NO in step S506), and the processing proceeds to step S507.

In step S507, the control unit 101 records the general-purpose image data generated in step S504, onto the nonvolatile memory 103.

An example of the development processing according to the present exemplary embodiment has been described above. The smartphone 200 can also execute the development processing. In addition, the server 300 can execute RAW development processing and RGB adjustment processing as development processing of RAW image data, using parameters similar to those used by the PC 100 and the smartphone 200. The server 300 appropriately receives parameters necessary for development processing of RAW image data from the PC 100 or the smartphone 200.

The RAW development processing in the development processing of RAW image data according to the present exemplary embodiment is image processing that is independent of a parameter designated by the user, and includes correction processing and noise reduction processing of image data. Thus, intermediate image data generated by the RAW development processing becomes similar data no matter how many times the RAW development processing is executed on the same RAW image data. Accordingly, in the present exemplary embodiment, the server 300 executes the RAW development processing on RAW image data only once. On the other hand, the RGB adjustment processing in the development processing of RAW image data according to the present exemplary embodiment is image processing executed based on a parameter designated by the user in such a manner that the appearance of general-purpose image data becomes image data suitable for the purpose or preference of the user. Thus, the user sometimes repeats the RGB adjustment processing until intermediate image data becomes general-purpose image data suitable for the purpose or preference. In view of the foregoing, in the present exemplary embodiment, cases are separated into a case where the PC 100 and the smartphone 200 execute the RGB adjustment processing, and a case where the server 300 executes the RGB adjustment processing. The specific processing will be described below. With this configuration, the PC 100 and the smartphone 200 can efficiently execute the development processing of RAW image data, which will be described below.

A condition for the processing proceeding to next step in step S503 may be other than determination by the control unit 101 that the adjustment of one parameter has been completed. For example, in a case where the control unit 101 displays a button for starting RGB adjustment processing on the display unit 106, reception, by the control unit 101, of an instruction to start RGB adjustment processing from the user via the operation unit 105 may be used as a condition.

In step S507, the control unit 101 records general-purpose image data onto the nonvolatile memory 103, but the control unit 101 may record general-purpose image data onto an external recording medium via the external recording device 110.

In the description of step S501, intermediate image data has been described as data having a file format different from that of RAW image data, but intermediate image data may have the same file format as that of RAW image data.

RAW Development Processing

FIG. 7 is a flowchart illustrating an example of the RAW development processing according to the present exemplary embodiment. The processing in this flowchart corresponds to the processing in step S501 of FIG. 5. In the present exemplary embodiment, the control unit 101 corrects RAW image data based on attribute information included in RAW image data.

In step S701, the control unit 101 corrects the aberration of RAW image data and corrupted data attributed to an image sensor of the imaging unit 202.

In step S702, the control unit 101 adjusts the black level of RAW image data.

In step S703, the control unit 101 adjusts white balance of RAW image data. In the present exemplary embodiment, the control unit 101 adjusts white balance of RAW image data using an automatic white balance function. By using the automatic white balance function, it becomes possible to adjust white balance also in subsequent RGB adjustment processing.

In step S704, the control unit 101 reduces noise in RAW image data that is attributed to the image sensor of the imaging unit 202.

In step S705, the control unit 101 executes pixel interpolation processing on RAW image data.

In step S706, the control unit 101 records the RAW image data processed in steps S701 to S705, onto the working memory 104 as intermediate image data.

The RAW development processing according to the present exemplary embodiment has been described above. The smartphone 200 and the server 300 can also execute the RAW development processing.

RGB Adjustment Processing

FIG. 8 is a flowchart illustrating an example of the RGB adjustment processing according to the present exemplary embodiment. The processing in this flowchart corresponds to the processing in step S504 of FIG. 5. In this step, the control unit 101 adjusts intermediate image data based on a parameter input from the user in step S503 of FIG. 5.

In step S801, the control unit 101 adjusts white balance of intermediate image data.

In step S802, the control unit 101 executes gamma adjustment of intermediate image data. In step S803, the control unit 101 executes color adjustment of intermediate image data. In step S804, the control unit 101 executes brightness adjustment of intermediate image data.

In step S805, the control unit 101 converts a color space of intermediate image data.

In step S806, the control unit 101 generates general-purpose image data from intermediate image data. For example, the control unit 101 compresses the intermediate image data based on an image format such as JPEG, PNG, HEVC, and TIFF, and generates general-purpose image data.

In step S807, the control unit 101 records the general-purpose image data onto the nonvolatile memory 103.

The RGB adjustment processing according to the present exemplary embodiment has been described above. The smartphone 200 and the server 300 can also execute the RGB adjustment processing.

In the RGB adjustment processing according to the present exemplary embodiment, the description has been given using, as an example, image processing such as white balance adjustment, gamma adjustment, color adjustment, and brightness adjustment. Aside from these, in the RGB adjustment processing, the control unit 101 may execute adjustment processing of hue, contrast, sharpness, and an image size based on a parameter input by the user in step S503 of FIG. 5.

The calculation amounts of aberration correction processing and noise correction processing in the RAW development processing according to the present exemplary embodiment are larger than the calculation amount of image processing in the RGB adjustment processing. This is because, while image processing in the RGB adjustment processing is processing of adjusting one pixel using data of one pixel itself, the aberration correction and the noise correction are processing of adjusting one pixel using data of a plurality of pixels using two-dimensional filtering, for example.

While the RAW development processing is not processing that is frequently executed, the RGB adjustment processing is image processing that might be frequently executed by the user. Thus, the PC 100 according to the present exemplary embodiment calculates the RAW development processing with a large calculation amount, using the server 300, and processes the RGB adjustment processing that can be frequently executed, using the GPU 108. On the other hand, a device with low image processing capacity like the smartphone 200 takes time in image processing even when the image processing is RGB adjustment processing with a smaller calculation amount than that of RAW development processing. Thus, the smartphone 200 calculates both the RAW development processing and the RGB adjustment processing using the server 300. With this configuration, the PC 100 and the smartphone 200 can reduce time taken for the development processing of RAW image data by using the server 300 in accordance with their respective image processing performances. By using the server 300 in accordance with the image processing capability of a device in this manner, the user can efficiently execute the development processing of RAW image data. Hereinafter, a specific example of such processing will be described.

Connection Processing with Server 300

Processing in which the PC 100 and the smartphone 200 each connect with the server 300 will be described with reference to FIGS. 9A and 9B. FIG. 9A is a sequence diagram illustrating an example of processing in which the PC 100 and the server 300 connect with each other. FIG. 9B is a sequence diagram illustrating an example of processing in which the smartphone 200 and the server 300 connect with each other.

First of all, processing in which the PC 100 and the server 300 connect with each other will be described with reference to FIG. 9A. The processing in this sequence is started in accordance with the user operating the PC 100 in such a manner as to connect with the server 300.

In step S901, the PC 100 establishes connection with the server 300.

In step S902, the PC 100 transmits performance information of itself to the server 300. The performance information includes, for example, information indicating that the PC 100 is a PC (stationary device), the specification of the GPU 108, and the current communication speed.

In step S903, the server 300 determines whether the PC 100 executes the RGB adjustment processing or the server 300 executes the RGB adjustment processing. In this step, based on the performance information of the PC 100 that has been received in step S902, the server 300 determines a device that executes the RGB adjustment processing. In the present exemplary embodiment, based on the performance information received in step S902, the server 300 can determine that the PC 100 is a stationary device, that the specification of the GPU 108 is equal to or higher than a predetermined performance, and that the communication speed of the PC 100 is faster than a predetermined threshold. The predetermined performance and the predetermined threshold are values arbitrarily determined by an administrator of the server 300. In the present exemplary embodiment, the server 300 determines that the performance of the PC 100 is equal to or higher than the predetermined performance, and determines that the PC 100 executes the RGB adjustment processing.

In step S904, the server 300 transmits a notification regarding the device that executes the RGB adjustment processing that has been determined in step S903. In the present exemplary embodiment, the server 300 transmits a notification indicating that the PC 100 executes the RGB adjustment processing, to the PC 100.

The processing in which the PC 100 and the server 300 connect with each other has been described above.

Next, processing in which the smartphone 200 and the server 300 connect with each other will be described with reference to FIG. 9B. The processing in this sequence is started in accordance with the user operating the smartphone 200 in such a manner as to connect with the server 300.

In step S951, the smartphone 200 establishes connection with the server 300.

In step S952, the smartphone 200 transmits performance information of itself to the server 300. The performance information includes, for example, information indicating that the smartphone 200 is a smartphone (portable device), the specification of the GPU 208, and the current communication speed.

In step S953, the server 300 determines whether the smartphone 200 executes the RGB adjustment processing or the server 300 executes the RGB adjustment processing. In this step, based on the performance information of the smartphone 200 that has been received in step S952, the server 300 determines a device that executes the RGB adjustment processing. In the present exemplary embodiment, based on the performance information received in step S952, the server 300 can determine that the smartphone 200 is a portable device, that the specification of the GPU 208 is lower than a predetermined performance, and that the communication speed of the PC 100 is slower than a predetermined threshold. The predetermined performance and the predetermined threshold are values arbitrarily determined by an administrator of the server 300. In the present exemplary embodiment, the server 300 determines that the performance of the smartphone 200 is lower than the predetermined performance, and determines that the server 300 executes the RGB adjustment processing.

In step S954, the server 300 transmits a determination result in step S953. In the present exemplary embodiment, the server 300 transmits a notification indicating that the server 300 executes the RGB adjustment processing, to the smartphone 200.

The processing in which the smartphone 200 and the server 300 connect with each other has been described above.

In steps S902 (FIG. 9A) and S952 (FIG. 9B), the PC 100 and the smartphone 200 may notify the server 300 of an effective value of the current communication speed or may notify the server 300 that a pay-for-use communication system is employed. In steps S903 and S953, using the information as well, the server 300 determines whether the server 300 executes the RGB adjustment processing.

In steps S903 and S953, the server 300 may determine a device that executes the RGB adjustment processing, based on a processing status of the server 300 itself. The processing status of the server 300 includes, for example, an occupancy rate of the GPU 308, the number of devices with which connection has been established, and the total capacity of RAW image data on which image processing is to be executed. In a case where the server 300 determines that a processing status of itself is a state with large load, the server 300 may determine that another device with which connection has been established executes the RGB adjustment processing, irrespective of the performance information of the other device. The state with large load includes, for example, a state where an occupancy rate of the GPU 308 is higher than a predetermined threshold, a state where the number of devices with which connection has been established is larger than a predetermined threshold, and a state where the total capacity of RAW image data on which image processing is to be executed is larger than a predetermined threshold. Alternatively, in a case where the server 300 determines that a processing status of itself is a state with small load, the server 300 determines a device that executes the RGB adjustment processing, in accordance with performance information of another device with which connection has been established. The state with small load includes, for example, a state where an occupancy rate of the GPU 308 is lower than a predetermined threshold, a state where the number of devices with which connection has been established is smaller than a predetermined threshold, and a state where the total capacity of RAW image data on which image processing is to be executed is smaller than a predetermined threshold. The thresholds are values arbitrarily determined by an administrator of the server 300.

Upload of RAW Image Data

Figure 10:
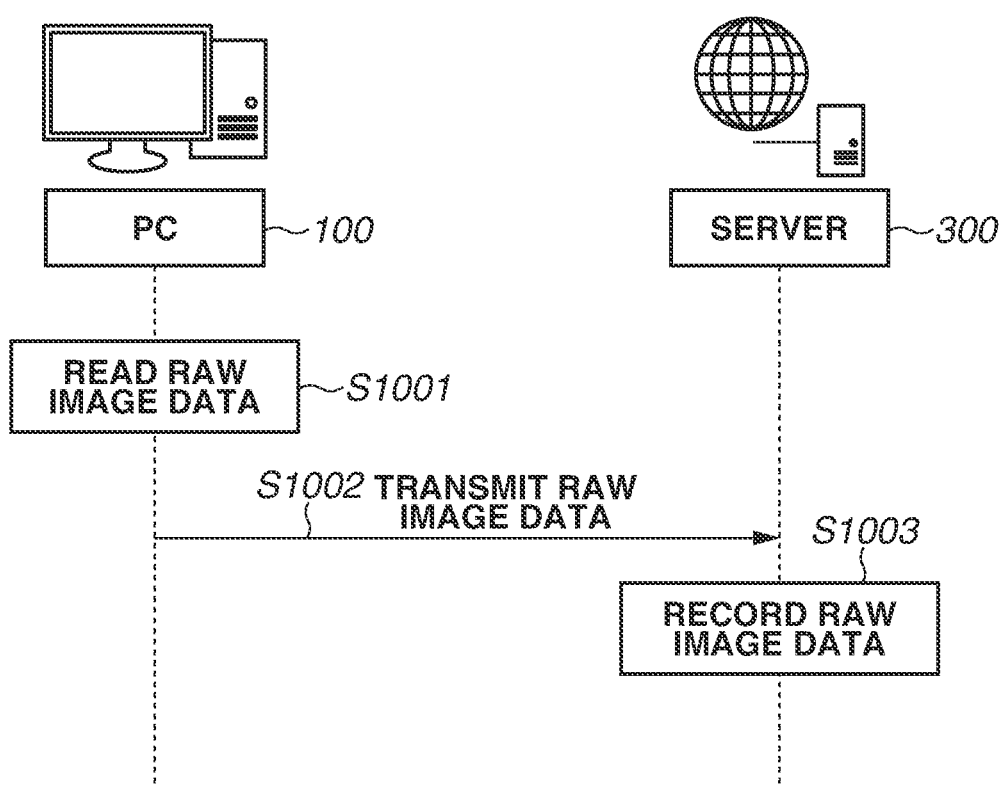
FIG. 10 is a sequence diagram illustrating an example of a procedure in which the PC according to the first exemplary embodiment uploads RAW image data to the server.

A procedure in which the PC 100 uploads RAW image data to the server 300 will be described with reference to FIG. 10. FIG. 10 is a sequence diagram illustrating an example of a procedure in which the PC 100 uploads RAW image data to the server 300. The processing in this sequence is started in accordance with the user operating the PC 100 in such a manner as to upload RAW image data to the server 300.

In step S1001, the PC 100 reads RAW image data to be transmitted to the server 300.

In step S1002, the PC 100 transmits the read RAW image data to the server 300.

In step S1003, the server 300 records the RAW image data received from the PC 100.

An example of the procedure in which the PC 100 uploads RAW image data to the server 300 has been described above.

Development Processing Performed by PC 100 and Server 300

Figure 11:
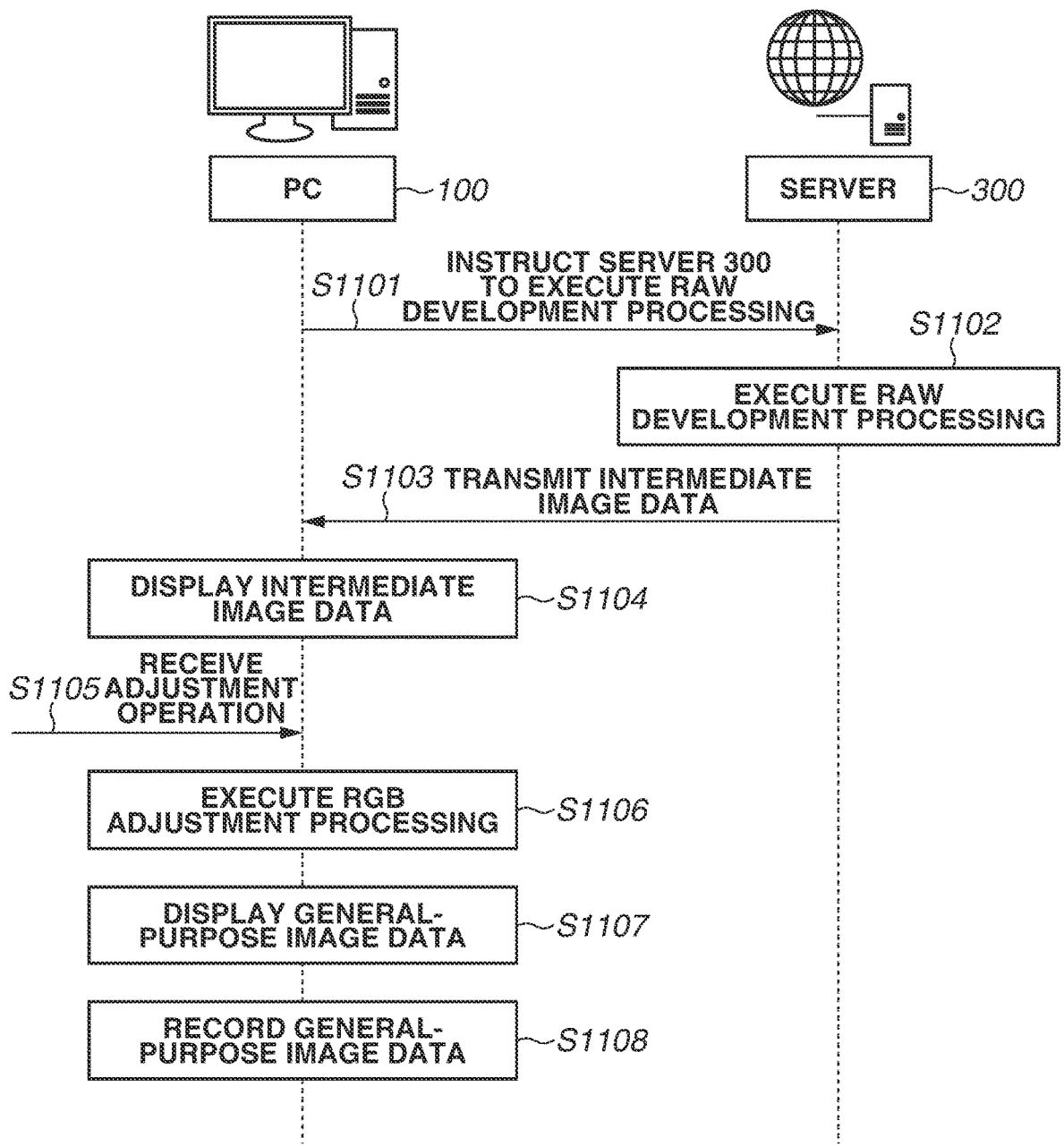
FIG. 11 is a sequence diagram illustrating an example of a procedure in which the PC according to the first exemplary embodiment executes development processing of RAW image data using the server.

Processing in which the PC 100 executes the development processing of RAW image data using the server 300 will be described with reference to FIG. 11. FIG. 11 is a sequence diagram illustrating an example of a procedure in which the PC 100 executes the development processing of RAW image data using the server 300. The processing in this sequence is started when the user issues a development instruction of RAW image data to the PC 100, for example. Before starting the processing in this sequence, the PC 100 preliminarily transmits RAW image data on which development processing is to be executed, to the server 300.

In step S1101, the PC 100 instructs the server 300 to execute RAW development processing of the RAW image data transmitted in step S1002 of FIG. 10.

In step S1102, the server 300 executes RAW development processing of the RAW image data of which a RAW development processing instruction has been issued in step S1101. The RAW development processing is processing performed in accordance with the flowchart illustrated in FIG. 7, for example.

In step S1103, the server 300 transmits intermediate image data generated by the RAW development processing in step S1102, to the PC 100.

In step S1104, the PC 100 displays the intermediate image data received in step S1103.

In step S1105, the PC 100 receives, from the user, an adjustment operation of a parameter in the RGB adjustment processing.

In step S1106, the PC 100 executes the RGB adjustment processing on the intermediate image data received in step S1103, based on the user operation received in step S1105. The RGB adjustment processing is processing performed in accordance with the flowchart illustrated in FIG. 8, for example.

In step S1107, the PC 100 displays general-purpose image data generated by the RGB adjustment processing in step S1106.

In step S1108, the PC 100 records the general-purpose image data generated by the RGB adjustment processing in step S1106.

An example of the development processing performed by the PC 100 and the server 300 has been described above.

Development Processing Performed by Smartphone 200 and Server 300

Figure 12:
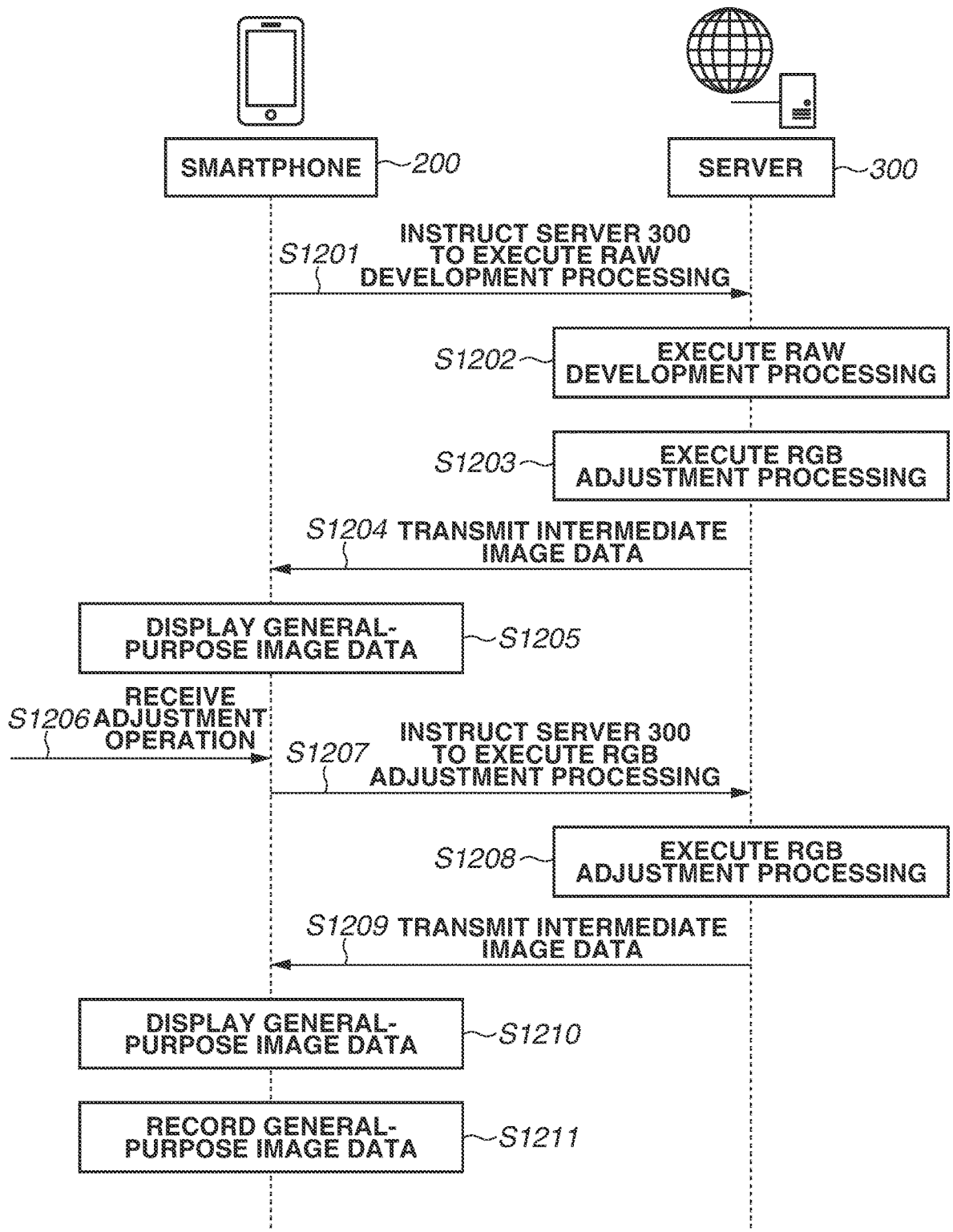
FIG. 12 is a sequence diagram illustrating an example of a procedure in which the smartphone according to the first exemplary embodiment executes development processing of RAW image data using the server.

Processing in which the smartphone 200 executes the development processing of RAW image data using the server 300 will be described with reference to FIG. 12. FIG. 12 is a sequence diagram illustrating an example of a procedure in which the smartphone 200 executes the development processing of RAW image data using the server 300. The processing in this sequence is started when the user issues a development instruction of RAW image data to the smartphone 200, for example. Before starting the processing in this sequence, the smartphone 200 preliminarily transmits RAW image data on which development processing is to be executed, to the server 300.

In step S1201, the smartphone 200 instructs the server 300 to execute RAW development processing of RAW image data transmitted in step S1002 of FIG. 10.

In step S1202, the server 300 executes RAW development processing of RAW image data of which a RAW development processing instruction has been issued in step S1201. The RAW development processing is processing performed in accordance with the flowchart illustrated in FIG. 7, for example.

In step S1203, the server 300 executes RGB adjustment processing on the intermediate image data generated by the RAW development processing in step S1202. The RGB adjustment processing is processing performed in accordance with the flowchart illustrated in FIG. 8, for example. A parameter in the RGB adjustment processing in this step is determined by the server 300.

In step S1204, the server 300 transmits general-purpose image data generated by the RGB adjustment processing in step S1202, to the smartphone 200.

In step S1205, the smartphone 200 displays the general-purpose image data received in step S1204.

In step S1206, the smartphone 200 receives, from the user, an adjustment operation of a parameter in the RGB adjustment processing.

In step S1207, the smartphone 200 instructs the server 300 to execute the RGB adjustment processing again, based on the user operation received in step S1206.

In step S1208, the server 300 executes the RGB adjustment processing on the intermediate image data generated by the RAW development processing in step S1202. The RGB adjustment processing is processing performed in accordance with the flowchart illustrated in FIG. 8, for example. A parameter in the RGB adjustment processing in this step is based on the instruction received from the smartphone 200 in step S1207.

In step S1209, the server 300 transmits the general-purpose image data generated by the RGB adjustment processing in step S1208, to the smartphone 200.

In step S1210, the smartphone 200 displays the general-purpose image data generated by the RGB adjustment processing in step S1209.

In step S1211, the smartphone 200 records the general-purpose image data generated by the RGB adjustment processing in step S1209.

An example of the development processing executed by the smartphone 200 and the server 300 has been described above.

Operation of PC and Smartphone

Figure 13:
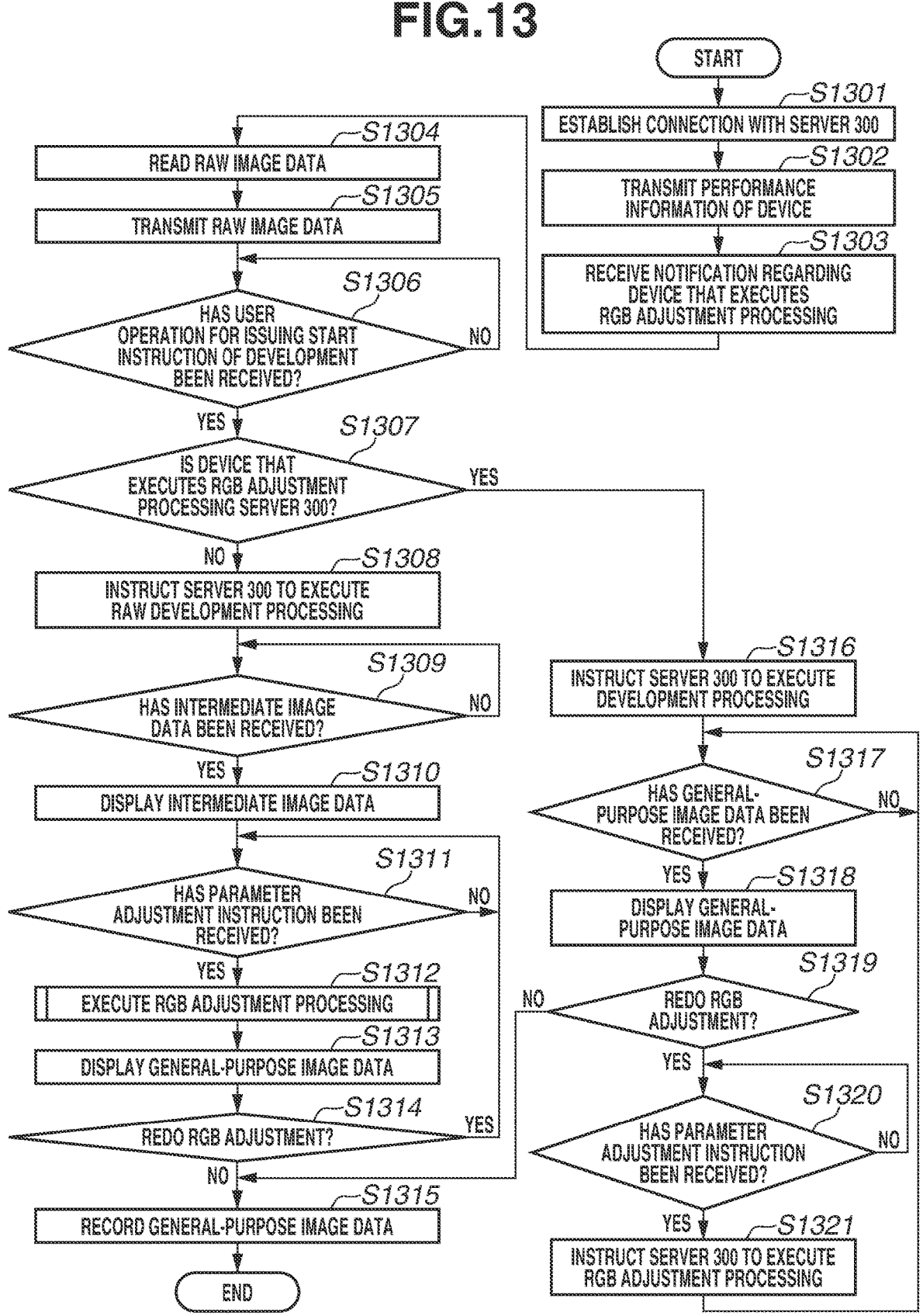
FIG. 13 is a flowchart illustrating an example of an operation of the PC according to the first exemplary embodiment.

An example of an operation of the PC 100 and the smartphone 200 each serving as an example of the first communication apparatus according to the present exemplary embodiment will be described. Hereinafter, an example of an operation of the PC 100 will be described. FIG. 13 is a flowchart illustrating an example of an operation of the PC 100. The processing in this flowchart is implemented by loading software recorded on the nonvolatile memory 103, onto the working memory 104, and executing the software by the control unit 101. The processing in this flowchart is started being triggered by the control unit 101 receiving an operation for issuing a connection instruction to the server 300, from the user via the operation unit 105.

In step S1301, the control unit 101 establishes connection with the server 300 via the connection unit 111. The processing in this step corresponds to the processing in step S901 of FIG. 9A and step S951 of FIG. 9B, for example.

In step S1302, the control unit 101 transmits performance information of itself to the server 300 via the connection unit 111. The performance information includes, for example, information indicating whether the PC 100 is a PC (stationary device) or a smartphone (portable device), the specification of the GPU 108, and the current communication speed. The processing in this step corresponds to the processing in step S902 of FIG. 9A and step S952 of FIG. 9B, for example.

In step S1303, the control unit 101 receives a notification regarding a device that executes the RGB adjustment processing, via the connection unit 111. The notification is a notification indicating whether a device that executes the RGB adjustment processing on intermediate image data is the PC 100 or the server 300, for example. The processing in this step corresponds to the processing in step S904 of FIG. 9A and the processing in step S954, for example.

In step S1304, the control unit 101 reads the RAW image data from the nonvolatile memory 103. The RAW image data read from the nonvolatile memory 103 is data selected by the user via the operation unit 105 to be transmitted to the server 300, for example. The processing in this step corresponds to the processing in step S1001 of FIG. 10, for example.

In step S1305, the control unit 101 transmits the RAW image data read in step S1304, to the server 300 via the connection unit 111. The processing in this step corresponds to the processing in step S1002 of FIG. 10, for example.

In step S1306, the control unit 101 determines whether an operation for issuing a start instruction of development processing of RAW image data transmitted to the server 300 has been received from the user. The control unit 101 receives an operation for issuing a start instruction of development processing, via the operation unit 105, for example. The control unit 101 waits until an operation for issuing a start instruction of development processing of RAW image data is received from the user. In a case where the control unit 101 determines that an operation for issuing a start instruction of development processing of RAW image data has been received from the user (YES in step S1306), the processing proceeds to step S1307.

In step S1307, the control unit 101 determines whether a device that executes the RGB adjustment processing is the server 300, based on the notification received in step S1303. In a case where a device that executes the RGB adjustment processing is the server 300 (YES in step S1307), the processing proceeds to step S1316. In a case where a device that executes the RGB adjustment processing is not the server 300 (NO in step S1307), that is to say, in a case where a device that executes the RGB adjustment processing is the PC 100, the processing proceeds to step S1308. First, a case where the control unit 101 determines that a device that executes the RGB adjustment processing is the PC 100 will be described.

In step S1308, the control unit 101 transmits a packet for issuing an execution instruction of RAW development processing of the RAW image data transmitted in step S1305, to the server 300 via the connection unit 111. The processing in this step corresponds to the processing in step S1101 of FIG. 11, for example.

In step S1309, the control unit 101 determines whether intermediate image data has been received from the server 300. The control unit 101 waits until intermediate image data is received from the server 300. In a case where the control unit 101 determines that intermediate image data has been received from the server 300, the processing proceeds to step S1310. The processing in this step corresponds to the processing in step S1103 of FIG. 11, for example.

In step S1310, the control unit 101 displays the intermediate image data received in step S1309 on the display unit 106. In this step, the control unit 101 displays the intermediate image data on the display unit 106 using the image processing application recorded on the nonvolatile memory 303, for example. The processing in this step corresponds to the processing in step S1104 of FIG. 11, for example.

In step S1311, the control unit 101 determines whether an adjustment instruction of a parameter in the RGB adjustment processing in step S1312 has been received from the user.

The control unit 101 receives the adjustment instruction of the parameter via the operation unit 105, for example. The control unit 101 waits until an adjustment instruction of a parameter is received from the user. In a case where the control unit 101 determines that an adjustment instruction of a parameter has been received from the user (YES in step S1311), the processing proceeds to step S1312. The processing in this step corresponds to the processing in step S1105 of FIG. 11, for example.

In step S1312, the control unit 101 executes the RGB adjustment processing on the intermediate image data received in step S1309, based on the parameter adjustment instruction received in step S1311. The RGB adjustment processing is processing described with reference to the flowchart in FIG. 8, for example. In this step, the control unit 101 generates general-purpose image data from intermediate image data. The processing in this step corresponds to the processing in step S1106 of FIG. 11, for example.

In step S1313, the control unit 101 displays the general-purpose image data generated in step S1312 on the display unit 106. The processing in this step corresponds to the processing in step S1107 of FIG. 11, for example.

In step S1314, the control unit 101 determines whether to redo the RGB adjustment processing. For example, in a case where the control unit 101 further receives an adjustment instruction of a parameter in the RGB adjustment processing via the operation unit 105, the control unit 101 determines to redo the RGB adjustment processing. Alternatively, for example, in a case where the control unit 101 receives a record instruction of general-purpose image data from the user via the operation unit 105, the control unit 101 determines not to redo the RGB adjustment processing. In a case where the control unit 101 determines to redo the RGB adjustment processing (YES in step S1314), the processing returns to step S1311. In a case where the control unit 101 determines not to redo the RGB adjustment processing (NO in step S1314), the processing proceeds to step S1315.

In step S1315, the control unit 101 records the general-purpose image data onto the nonvolatile memory 103. The processing in this step corresponds to the processing in step S1108 of FIG. 11 and step S1211 of FIG. 12, for example.

Next, a case where the control unit 101 determines in step S1307 that a device that executes the RGB adjustment processing is the server 300 will be described.

In step S1316, the control unit 101 transmits a packet for issuing an execution instruction of RAW development processing and RGB adjustment processing of the RAW image data transmitted in step S1305, to the server 300 via the connection unit 111. The processing in this step corresponds to the processing in step S1201 of FIG. 12, for example.

In step S1317, the control unit 101 determines whether general-purpose image data has been received from the server 300. The control unit 101 waits until general-purpose image data is received from the server 300. In a case where the control unit 101 determines that general-purpose image data has been received from the server 300 (YES in step S1317), the processing proceeds to step S1310. The processing in this step corresponds to the processing in step S1204 of FIG. 12, for example.

In step S1318, the control unit 101 displays the general-purpose image data received in step S1317 on the display unit 106. The processing in this step corresponds to the processing in steps S1205 and S1210 of FIG. 12, for example.

In step S1319, the control unit 101 determines whether to redo the RGB adjustment processing. For example, in a case where the control unit 101 further receives an adjustment instruction of a parameter in the RGB adjustment processing, via the operation unit 105, the control unit 101 determines to redo the RGB adjustment processing. Alternatively, for example, in a case where the control unit 101 receives a record instruction of general-purpose image data from the user via the operation unit 105, the control unit 101 determines not to redo the RGB adjustment processing. In a case where the control unit 101 determines to redo the RGB adjustment processing (YES in step S1319), the processing proceeds to step S1320. In a case where the control unit 101 determines not to redo the RGB adjustment processing (NO in step S1319), the processing proceeds to step S1315.

In step S1320, the control unit 101 determines whether an adjustment instruction of a parameter in the RGB adjustment processing of the general-purpose image data received in step S1317 has been received from the user. The control unit 101 receives the adjustment instruction of the parameter via the operation unit 105, for example. The control unit 101 waits until an adjustment instruction of a parameter is received from the user. In a case where the control unit 101 determines that an adjustment instruction of a parameter has been received from the user (YES in step S1320), the processing proceeds to step S1321. The processing in this step corresponds to the processing in step S1206 of FIG. 12, for example.

In step S1321, the control unit 101 transmits a packet for issuing a re-execution instruction of the RGB adjustment processing based on the parameter adjustment instruction received in step S1320, to the server 300 via the connection unit 111. The packet includes a parameter to be used in the RGB adjustment processing that has been received by the control unit 101 in step S1320. The processing in this step corresponds to the processing in step S1207 of FIG. 12, for example.

An operation of the PC 100 serving as an example of the first communication apparatus according to the present exemplary embodiment has been described above. The smartphone 200 according to the present exemplary embodiment operates similarly to the PC 100.

Operation of Server

Figure 14:
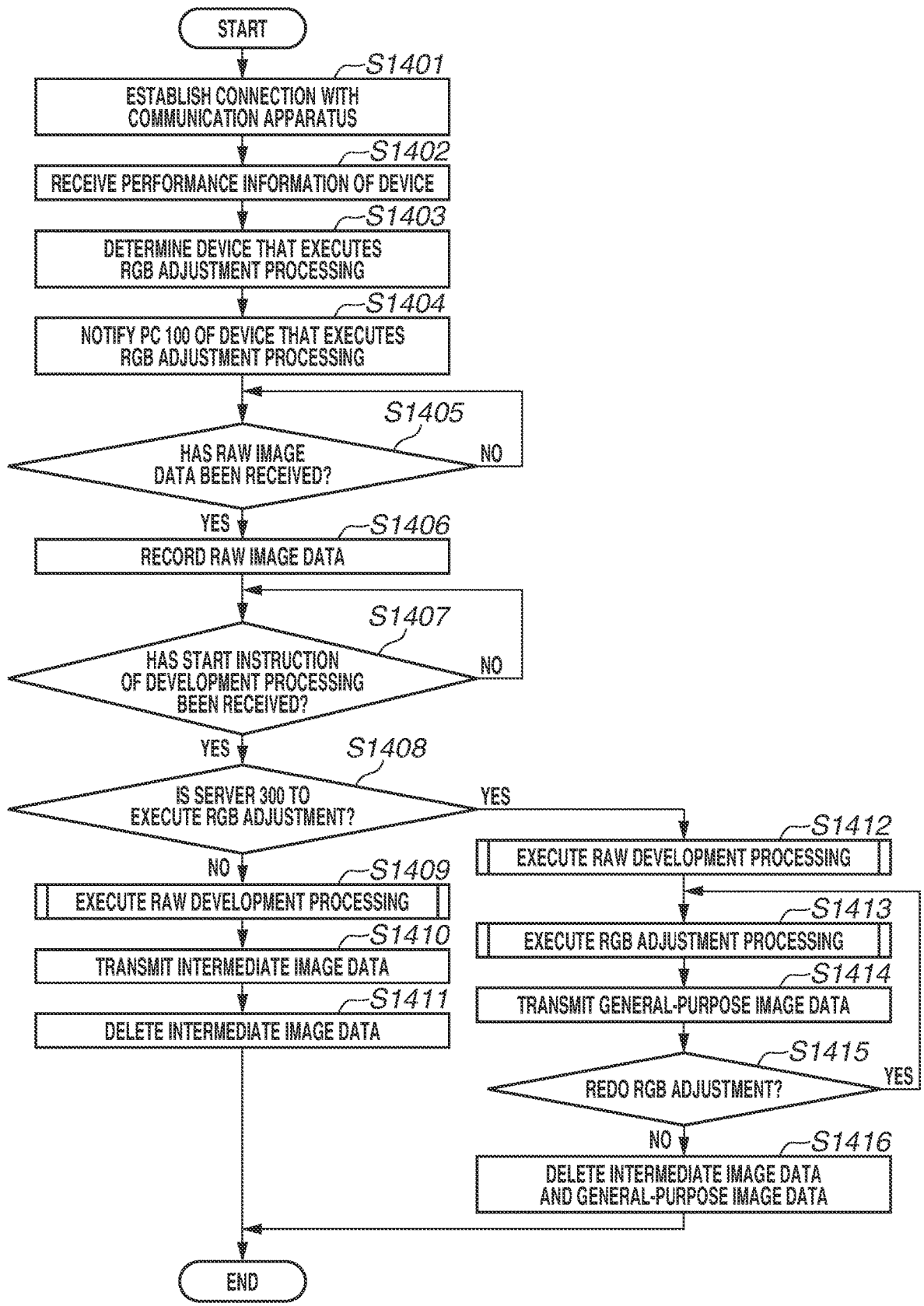
FIG. 14 is a flowchart illustrating an example of an operation of the server according to the first exemplary embodiment.

An example of an operation of the server 300 according to the present exemplary embodiment will be described. FIG. 14 is a flowchart illustrating an example of an operation of the server 300. The processing in this flowchart is implemented by loading software recorded on the nonvolatile memory 303, onto the working memory 304, and executing the software by the control unit 301. The processing in this flowchart is started being triggered by the control unit 301 receiving a connection request packet from a communication apparatus via the connection unit 311. In the processing in this flowchart, a case where the server 300 and the PC 100 connect with each other will be described.

In step S1401, the control unit 301 establishes connection with the PC 100 via the connection unit 311. The processing in this step corresponds to the processing in step S901 of FIG. 9A and step S951 of FIG. 9B, for example.

In step S1402, the control unit 301 receives performance information of the PC 100 from the PC 100 via the connection unit 311. The performance information includes, for example, information indicating whether the PC 100 is a PC (stationary device) or a smartphone (portable device), the specification of the GPU 108, and the current communication speed. The processing in this step corresponds to the processing in step S902 of FIG. 9A and step S952 of FIG. 9B, for example.

In step S1403, the control unit 301 determines a device that executes the RGB adjustment processing. In the present exemplary embodiment, the control unit 301 determines whether the PC 100 executes the RGB adjustment processing or the server 300 executes the RGB adjustment processing. In this step, the control unit 301 determines a device that executes the RGB adjustment processing, based on the performance information of the PC 100 that has been received in step S1402. In a case where the control unit 301 determines that the performance information of the PC 100 indicates a performance equal to or higher than a predetermined performance, the control unit 301 determines that the PC 100 executes the RGB adjustment processing. In a case where the control unit 301 determines that the performance information of the PC 100 indicates a performance lower than the predetermined performance, the control unit 301 determines that the server 300 executes the RGB adjustment processing. The processing in this step corresponds to the processing in step S903 of FIG. 9A and step S953 of FIG. 9B, for example.

In step S1404, the control unit 301 transmits a notification regarding the device that executes the RGB adjustment processing that has been determined in step S1403, to the PC 100 via the connection unit 311. The processing in this step corresponds to the processing in step S904 of FIG. 9A and step S954 of FIG. 9B, for example.

In step S1405, the control unit 301 determines whether RAW image data has been received from the PC 100. The control unit 301 waits until RAW image data is received from the PC 100. In a case where the control unit 301 determines that RAW image data has been received from the PC 100 (YES in step S1405), the processing proceeds to step S1406. The processing in this step corresponds to the processing in step S1002 of FIG. 10, for example.

In step S1406, the control unit 301 records the RAW image data received in step S1405 onto the nonvolatile memory 303. The processing in this step corresponds to the processing in step S1003 of FIG. 10, for example.

In step S1407, the control unit 301 determines whether a start instruction of the development processing of RAW image data has been received from the PC 100. For example, the control unit 301 waits until a start instruction of development processing of the RAW image data received in step S1406 is received from the PC 100. In a case where the control unit 301 determines that a start instruction of development processing of the RAW image data has been received from the PC 100 (YES in step S1407), the processing proceeds to step S1408. The processing in this step corresponds to the processing in step S1101 of FIG. 11 and step S1201 of FIG. 12, for example.

In step S1408, the control unit 301 determines whether the server 300 is to execute the RGB adjustment processing. For example, in a case where an execution instruction of the RAW development processing has been issued from the PC 100 in step S1407, the control unit 301 determines that the server 300 is not to execute the RGB adjustment processing. Alternatively, for example, in a case where an execution instruction of the RAW development processing and the RGB adjustment processing has been issued from the PC 100 in step S1407, the control unit 301 determines that the server 300 is to execute the RGB adjustment processing. In a case where the control unit 301 determines that the server 300 is not to execute the RGB adjustment processing (NO in step S1408), the processing proceeds to step S1409. In a case where the control unit 301 determines that the server 300 is to execute the RGB adjustment processing (YES in step S1408), the processing proceeds to step S1412. First of all, a case where the server 300 is not to execute the RGB adjustment processing will be described.

In step S1409, the control unit 301 executes the RAW development processing on the RAW image data received in step S1405. For example, the control unit 301 executes the RAW development processing on the RAW image data in accordance with the processing of the flowchart illustrated in FIG. 7. In this step, the control unit 301 generates the intermediate image data. The processing in this step corresponds to the processing in step S1102 of FIG. 11, for example.

In step S1410, the control unit 301 transmits the intermediate image data to the PC 100 via the connection unit 311. The processing in this step corresponds to the processing in step S1103 of FIG. 11, for example.

In step S1411, the control unit 301 deletes the intermediate image data transmitted to the PC 100, and ends the processing.

Next, a case where the server 300 executes the RGB adjustment processing will be described.

In step S1412, the control unit 301 executes the RAW development processing on the RAW image data received in step S1405. For example, the control unit 301 executes the RAW development processing on the RAW image data in accordance with the processing of the flowchart illustrated in FIG. 7. In this step, the control unit 301 generates intermediate image data. The processing in this step corresponds to the processing in step S1202 of FIG. 12, for example.

In step S1413, the control unit 301 executes the RGB adjustment processing on the intermediate image data generated in step S1412. For example, the control unit 301 executes the RGB adjustment processing on the intermediate image data in accordance with the processing of the flowchart illustrated in FIG. 8. In this step, the control unit 301 generates general-purpose image data. The processing in this step corresponds to the processing in step S1203 of FIG. 12, for example.

In step S1414, the control unit 301 transmits the general-purpose image data to the PC 100 via the connection unit 311. The processing in this step corresponds to the processing in steps S1204 and S1209 of FIG. 12, for example.

In step S1415, the control unit 301 determines whether to redo the RGB adjustment processing. For example, in a case where the control unit 301 receives an adjustment instruction of a parameter in the RGB adjustment processing from the PC 100 via the connection unit 311, the control unit 301 determines to redo the RGB adjustment processing. Alternatively, for example, in a case where the control unit 301 has not received an adjustment instruction of a parameter in the RGB adjustment processing from the PC 100 for a predetermined time, the control unit 301 determines not to redo the RGB adjustment processing. The predetermined time is one hour or one day, for example. The time is a time that enables the user to at least adjust a parameter in the RGB adjustment processing. In a case where the control unit 301 determines to redo the RGB adjustment processing (YES in step S1415), the processing returns to step S1413. In a case where the control unit 301 determines not to redo the RGB adjustment processing (NO in step S1415), the processing proceeds to step S1416.

In step S1416, the control unit 301 deletes the intermediate image data generated in step S1412 and the general-purpose image data generated in step S1413, and ends the processing.

An operation of the server 300 serving as an example of an external device according to the present exemplary embodiment has been described above. In the present exemplary embodiment, the description has been given of a case where the server 300 connects with the PC 100, but the server 300 similarly operates in the case of connecting with the smartphone 200.

In step S1408, using a result determined in step S1403, the control unit 301 may determine whether to execute the RAW development processing, or execute the RAW development processing and the RGB adjustment processing.

In a case where the communication speeds of the PC 100 or the smartphone 200 are slow, or in a case where a pay-for-use communication system is employed, the server 300 determines that the server 300 executes the RGB adjustment processing irrespective of a processing performance of a communication apparatus with which connection has been established. This is because the data capacity of general-purpose image data is generally smaller than that of intermediate image data, and the server 300 can therefore perform communication in such a manner that the data capacity involved in one data transmission/reception becomes small.

The server 300 may determine a device that executes the RGB adjustment processing, based on whether data to be transmitted to a stationary device such as a PC is transmitted to another device, or data to be transmitted to a portable device such as a smartphone is transmitted to another device. In a case where the server 300 transmits data to be transmitted to a stationary device such as a PC, the server 300 determines that a performance of the other device is equal to or higher than a predetermined performance, and the server 300 determines that the other device executes the RGB adjustment processing. Alternatively, in a case where the server 300 transmits data to be transmitted to a portable device such as a smartphone, the server 300 determines that a performance of the other device is lower than the predetermined performance, and the server 300 determines to execute the RGB adjustment processing. In this manner, by determining a device that executes the RGB adjustment processing, based on data transmitted to another device, the server 300 can determine whether another device has a predetermined performance, without receiving performance information from the other device.

As described above in the present exemplary embodiment, the PC 100 and the smartphone 200 execute development processing of RAW image data that is based on performance information of itself, using the server 300. The PC 100 and the smartphone 200 can thereby efficiently execute the development processing of RAW image data.

In the first exemplary embodiment, the server 300 determines a device that executes RGB adjustment processing. In a second exemplary embodiment, processing in which the PC 100 and the smartphone 200 determine a device that executes RGB adjustment processing will be described. The device configurations of the PC 100, the smartphone 200, and the server 300 are similar to those in the first exemplary embodiment. In addition, the system configuration is also similar to that in the first exemplary embodiment.

Figure 15:
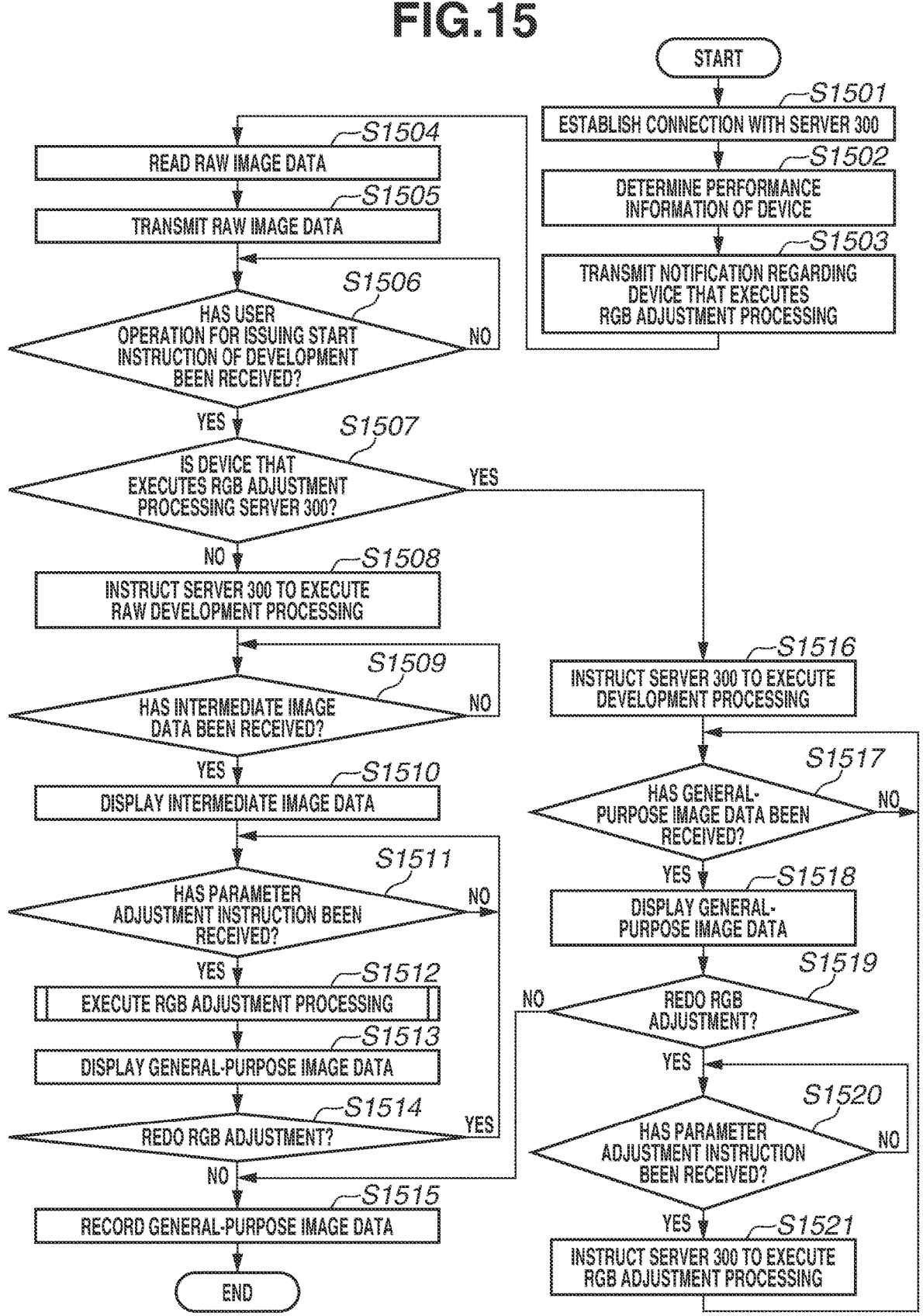
FIG. 15 is a flowchart illustrating an example of an operation of a PC according to a second exemplary embodiment.

FIG. 15 is a flowchart illustrating an example of an operation of the PC 100 according to the second exemplary embodiment.

In step S1501, the control unit 101 establishes connection with the server 300 via the connection unit 111.

In step S1502, the control unit 101 determines a device that executes RGB adjustment processing, based on performance information of itself. In the present exemplary embodiment, the control unit 101 determines whether the PC 100 executes the RGB adjustment processing or the server 300 executes the RGB adjustment processing. The performance information includes, for example, information indicating whether the PC 100 is a PC (stationary device) or a smartphone (portable device), the specification of the GPU 108, and the current communication speed. In a case where the control unit 101 determines that the performance information of the PC 100 indicates a performance equal to or higher than a predetermined performance, the control unit 101 determines that the PC 100 executes the RGB adjustment processing. In a case where the control unit 101 determines that the performance information of the PC 100 indicates a performance lower than the predetermined performance, the control unit 101 determines that the server 300 executes the RGB adjustment processing.

In step S1503, the control unit 101 transmits a notification regarding the device that executes the RGB adjustment processing that has been determined in step S1502, to the server 300 via the connection unit 111. In the present exemplary embodiment, the control unit 101 transmits a notification indicating whether the PC 100 executes the RGB adjustment processing or the server 300 executes the RGB adjustment processing, to the server 300.

Because the processing in steps S1504 to S1521 is similar to the processing in steps S1304 to S1321, respectively, of FIG. 13, the description thereof will be omitted.

An example of an operation of the PC 100 according to the second exemplary embodiment has been described above. The smartphone 200 also operates similarly. In this manner, the PC 100 and the smartphone 200 execute development processing of RAW image data based on performance information of itself using the server 300. The PC 100 and the smartphone 200 can thereby efficiently execute development processing of RAW image data.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-199105, filed Oct. 31, 2019, which is hereby incorporated by reference herein in its entirety.

What is claimed is:

1. A first communication apparatus comprising:
a communication unit configured to communicate with a second communication apparatus;
an image processing unit; and
a control unit configured to control a function of generating first image data from RAW image data by the image processing unit, and a function of generating second image data from the first image data by the image processing unit,
wherein the control unit develops RAW image data by generating, by the image processing unit, the second image data from the first image data generated from RAW image data,
wherein the control unit receives RAW image data from the second communication apparatus via the communication unit,
wherein the control unit generates, by the image processing unit, the first image data from the RAW image data received from the second communication apparatus,
wherein, in a case where the control unit determines that a performance of the second communication apparatus is equal to or higher than a predetermined performance, the control unit transmits the first image data generated from the RAW image data received from the second communication apparatus, to the second communication apparatus via the communication unit, and
wherein, in a case where the control unit determines that a performance of the second communication apparatus is lower than the predetermined performance, the control unit generates, by the image processing unit, the second image data from the first image data generated from the RAW image data received from the second communication apparatus, and transmits the generated second image data to the second communication apparatus via the communication unit.

2. The first communication apparatus according to claim 1,
wherein the control unit receives performance information of the second communication apparatus via the communication unit in accordance with connection with the second communication apparatus being established, and
wherein, the control unit determines whether a performance of the second communication apparatus is equal to or higher than the predetermined performance or lower than the predetermined performance, based on the performance information received from the second communication apparatus.

3. The first communication apparatus according to claim 1, wherein, in a case where the second communication apparatus is a stationary device, the control unit determines that a performance of the second communication apparatus is equal to or higher than the predetermined performance, and in a case where the second communication apparatus is a portable device, the control unit determines that a performance of the second communication apparatus is lower than the predetermined performance.

4. The first communication apparatus according to claim 1, wherein, in a case where the control unit transmits data to be transmitted to a stationary device, to the second communication apparatus, the control unit determines that a performance of the second communication apparatus is equal to or higher than the predetermined performance, and in a case where the control unit transmits data to be transmitted to a portable device, to the second communication apparatus, the control unit determines that a performance of the second communication apparatus is lower than the predetermined performance.

5. The first communication apparatus according to claim 1, wherein, in a case where the control unit transmits the second image data to the second communication apparatus, in accordance with receiving a parameter to be used in generating the second image data, from the second communication apparatus via the communication unit, the control unit generates the second image data again by the image processing unit using the parameter, and transmits the second image data generated again, to the second communication apparatus via the communication unit.

6. The first communication apparatus according to claim 1, wherein, in a case where the control unit determines that a processing status is a state with large load, the control unit generates, by the image processing unit, the first image data from the RAW image data received from the second communication apparatus, irrespective of a performance of the second communication apparatus, and transmits the generated first image data to the second communication apparatus via the communication unit.

7. The first communication apparatus according to claim 1, wherein, in a case where the control unit transmits the first image data to the second communication apparatus, the control unit deletes the first image data.

8. The first communication apparatus according to claim 1, wherein, in a case where the control unit transmits the second image data to the second communication apparatus, the control unit deletes the first image data and the second image data.

9. The first communication apparatus according to claim 1,
wherein image processing of generating the first image data from RAW image data by the image processing unit is image processing including at least one piece of processing of correction processing and noise reduction processing of RAW image data, and
wherein image processing of generating the second image data from the first image data by the image processing unit is image processing including adjustment of at least any one of saturation, gradation, white balance, hue, contrast, brightness, sharpness, and resize of the first image data.

10. The first communication apparatus according to claim 1, wherein an image format of the first image data is different from both of an image format of the RAW image data and an image format of the second image data.

11. The first communication apparatus according to claim 1, wherein an image format of the second image data is at least one of Joint Photographic Experts Group (JPEG), Portable Network Graphics (PNG), High Efficiency Video Coding (HEVC), and a Tag Image File Format (TIFF).

12. A first communication apparatus comprising:
a communication unit configured to communicate with a second communication apparatus;
an image processing unit; and
a control unit configured to control a function of generating first image data from RAW image data by the image processing unit, and a function of generating second image data from the first image data by the image processing unit, wherein the control unit develops RAW image data by generating, by the image processing unit, the second image data from the first image data generated from the RAW image data, wherein the control unit transmits the RAW image data to the second communication apparatus via the communication unit, wherein, in a case where the control unit determines that a performance of the first communication apparatus is lower than a predetermined performance, the control unit receives the second image data generated from the first image data generated from the RAW image data transmitted to the second communication apparatus, from the second communication apparatus via the communication unit, and wherein, in a case where the control unit determines that a performance of the first communication apparatus is equal to or higher than the predetermined performance, the control unit receives the first image data generated from the RAW image data, from the second communication apparatus via the communication unit, and generates, by the image processing unit, the second image data from the first image data received from the second communication apparatus.

13. The first communication apparatus according to claim 12, wherein, in a case where the control unit receives the second image data from the second communication apparatus via the communication unit, the control unit transmits a parameter to be used in generating the second image data from the first image data, to the second communication apparatus via the communication unit, and receives the second image data generated using the parameter, from the second communication apparatus via the communication unit.

14. The first communication apparatus according to claim 12, further comprising:
a display unit; and
an operation unit configured to receive a user operation,
wherein the control unit receives a parameter to be used in generating the second image data from the first image data, via the operation unit, and
wherein, in a case where the control unit generates the second image data from the first image data by the image processing unit based on the parameter, the control unit displays the second image data on the display unit.

15. The first communication apparatus according to claim 1, wherein the first image data is image data generated by performing image processing on RAW image data based on attribute information included in the RAW image data.

16. The first communication apparatus according to claim 1, wherein a calculation amount of image processing of generating the first image data from RAW image data is larger than a calculation amount of image processing of generating the second image data from the first image data.

17. A control method of a first communication apparatus including a communication unit configured to communicate with a second communication apparatus, and an image processing unit, the control method comprising:
generating first image data from RAW image data by the image processing unit;
generating second image data from the first image data by the image processing unit;
developing RAW image data by executing the generation of the first image data and the generation of the second image data;
receiving RAW image data from the second communication apparatus via the communication unit;
generating, by the image processing unit, the first image data from the RAW image data received from the second communication apparatus;
in a case where it is determined that a performance of the second communication apparatus is equal to or higher than a predetermined performance, transmitting the first image data generated from the RAW image data received from the second communication apparatus, to the second communication apparatus via the communication unit; and
in a case where it is determined that a performance of the second communication apparatus is lower than the predetermined performance, transmitting the second image data generated from the first image data generated from the RAW image data received from the second communication apparatus, to the second communication apparatus via the communication unit.

18. A control method of a first communication apparatus including a communication unit configured to communicate with a second communication apparatus, and an image processing unit, the control method comprising:
generating first image data from RAW image data by the image processing unit;
generating second image data from the first image data by the image processing unit;
transmitting RAW image data to the second communication apparatus via the communication unit;
in a case where it is determined that a performance of the first communication apparatus is lower than a predetermined performance, receiving the second image data developed from the RAW image data transmitted to the second communication apparatus, from the second communication apparatus via the communication unit; and
in a case where it is determined that a performance of the first communication apparatus is equal to or higher than the predetermined performance, receiving the first image data generated from the RAW image data, from the second communication apparatus via the communication unit, and generating, by the image processing unit, the second image data from the first image data received from the second communication apparatus.

19. A non-transitory recording medium recording a program for causing a first communication apparatus to execute a control method, the first communication apparatus including a communication unit configured to communicate with a second communication apparatus, and an image processing unit, the control method comprising:
generating first image data from RAW image data by the image processing unit;
generating second image data from the first image data by the image processing unit;
developing RAW image data by executing the generation of the first image data and the generation of the second image data;
receiving RAW image data from the second communication apparatus via the communication unit;
generating, by the image processing unit, the first image data from the RAW image data received from the second communication apparatus;
in a case where it is determined that a performance of the second communication apparatus is equal to or higher than a predetermined performance, transmitting the first image data generated from the RAW image data received from the second communication apparatus, to the second communication apparatus via the communication unit; and in a case where it is determined that a performance of the second communication apparatus is lower than the predetermined performance, transmitting the second image data generated from the first image data generated from the RAW image data received from the second communication apparatus, to the second communication apparatus via the communication unit.

20. A non-transitory recording medium recording a program for causing a first communication apparatus to execute a control method, the first communication apparatus including a communication unit configured to communicate with a second communication apparatus, and an image processing unit, the control method comprising:

generating first image data from RAW image data by the image processing unit;

generating second image data from the first image data by the image processing unit;

transmitting RAW image data to the second communication apparatus via the communication unit;

in a case where it is determined that a performance of the first communication apparatus is lower than a predetermined performance, receiving the second image data developed from the RAW image data transmitted to the second communication apparatus, from the second communication apparatus via the communication unit; and in a case where it is determined that a performance of the first communication apparatus is equal to or higher than the predetermined performance, receiving the first image data generated from the RAW image data, from the second communication apparatus via the communication unit, and generating, by the image processing unit, the second image data from the first image data received from the second communication apparatus.

* * * * *